United States Patent [19]
Christensen et al.

[11] Patent Number: 5,617,737
[45] Date of Patent: Apr. 8, 1997

[54] CAPILLARY FLUTED TUBE MASS AND HEAT TRANSFER DEVICES AND METHODS OF USE

[75] Inventors: Richard N. Christensen; F. Bert Cook; Yong-Tae Kang, all of Columbus, Ohio

[73] Assignee: The Ohio State University Research Foundation, Columbus, Ohio

[21] Appl. No.: 510,592

[22] Filed: Aug. 2, 1995

[51] Int. Cl.$^6$ ............................ F25B 15/00; F25B 37/00; F25B 33/00
[52] U.S. Cl. ................................ 62/487; 62/494; 62/497; 165/104.26
[58] Field of Search ...................... 62/101, 476, 487–488, 62/494–497; 165/104.26–104.25

[56] References Cited

U.S. PATENT DOCUMENTS

| | | | |
|---|---|---|---|
| 3,681,938 | 8/1972 | Blomberg et al. | 62/490 |
| 3,730,229 | 5/1973 | D'Onofrio | 138/114 |
| 4,438,807 | 3/1984 | Mathur et al. | 165/133 |
| 4,589,481 | 5/1986 | Månsson | 165/172 |
| 4,903,761 | 2/1990 | Cima | 165/104.25 |
| 4,938,028 | 7/1990 | Murray | 62/108 |
| 5,044,429 | 9/1991 | Sakaya et al. | 165/104.26 |
| 5,219,021 | 6/1993 | Edelstein et al. | 165/104.26 |
| 5,325,684 | 7/1994 | Stierlin et al. | 62/487 |
| 5,339,654 | 8/1994 | Cook et al. | 62/476 |

*Primary Examiner*—William Doerrler
*Attorney, Agent, or Firm*—Philip J. Pollick

[57] ABSTRACT

A capillary twisted fluted tube is formed with an interior helical capillary flute and associated interior helical crest and a complementary exterior helical crest and flute, respectively. Liquid rises in the interior capillary flute and is expelled at or near the top of the tube in fine droplets that promote mass transfer efficiencies as a result of improved vapor-equilibrium. A capillary fluted tube placed in a helical groove of a heat insulating material to expose only one side of the tube to hot combustion products promotes increased capillary rise on one side of the tube with increased expulsion and spatter of liquid from the capillary channel. Exterior tube heat transfer is enhanced by enclosing the tube in a second tube or forming the tube into a winding and enclosing the winding in a cylinder. Contact of the exterior tube crests with the enclosing tube or cylinder improves heat transfer efficiencies as a result of confined flow of heat transfer fluid within the enclosing tube or cylinder. The capillary tube can have multiple sections with separate enclosing tubes and cylinders to take advantage of different heat transfer fluids or direct process-to-process heat exchange for each section.

218 Claims, 16 Drawing Sheets

5,617,737

CAPILLARY FLUTED TUBE MASS AND HEAT TRANSFER DEVICES AND METHODS OF USE

BACKGROUND OF THE INVENTION

1. Field of the Invention

The present invention relates to a mass and heat transfer device and method. More particularly it is a heat and mass transfer device formed as a capillary fluted tube especially effective in evaporation and desorption devices such as found in heat transfer machines.

2. Background

Absorption refrigeration machines are heat operated refrigeration machines that operate on one of the earliest know principles of refrigeration. In its basic form, it consists of an interconnected absorber, desorber (generator), condenser, and evaporator that use a refrigerant and an absorbent as a refrigerant or solution pair and a heat source to transfer heat between a heat load and a heat sink.

The absorber contacts low pressure refrigerant vapor with a miscible absorbent. Absorption takes place as a result of the mixing tendency of the miscible materials as well as an affinity between the refrigerant vapor and the absorbent and results in the generation of thermal energy which is released to the heat sink. The mixture formed by the absorption process, which is referred to here as a strong solution, is typically pressurized by means of a solution pump and conveyed via a heat exchanger to the desorber (generator).

The generator (desorber) causes the refrigerant vapor and absorbent to separate as a result of the application of heat. When the absorbent is a nonvolatile material, heating of the strong solution is sufficient to accomplish complete separation of the refrigerant vapor. The remaining absorbent, referred to as a weak solution, is returned to the absorber to again begin the absorption process.

When the absorbent is a volatile material such as water in an ammonia/water refrigerant pair, a rectifier is required to move the last traces of the volatile absorbent (water) from the refrigerant vapor (ammonia). As used here, the term "rectifier" includes all types of fractional distillation equipment used to remove a volatile absorbent from the refrigerant vapor. Rectification results in heat generation as the volatile absorbent condenses to a liquid. The heat from the rectification process is also released to a heat sink. Removal of the absorbent from the refrigerant vapor is essential in that contamination of the refrigerant vapor with absorbent interferes with refrigerant vaporization in the latter refrigerant vaporization step.

After rectification, the vapor passes to the condenser. The condenser condenses the refrigerant vapor to a liquid with the liberation of heat. The hot liquid refrigerant then passes to the evaporator.

The evaporator revaporizes the hot refrigerant liquid at low pressure and temperature with input of heat from the heat load, i.e., from the refrigerator, room, building, or other medium the system was designed to cool. From the evaporator, the refrigerant vapor enters the absorber to again cycle through the process. FIG. 24 illustrates a typical single cycle absorption system. The temperature of the components increases from left to right while pressure increases from bottom to top.

In its basic form, the generator typically is a vertical tank in which strong solution is heated. The strong solution can be heated by means of a heat exchange coil that is submerged in the strong solution and through which is passed either steam or a hot liquid. Alternatively the generator may be heated by hot gases such as the combustion products from the combustion of a fuel source such as natural gas. To facilitate heat transfer when using combustion products, the vertical tank is typically finned on the outside to extract heat from the combustion products.

U.S. Pat. No. 4,972,692 (Re. 34,747) Petty et al. discloses a generator made from a finned double-wound helical coil of tubing. The tubing is a conventional, single tube with small, fine fins. Hot combustion products are circulated through the fins of the coils of the generator with a blower. A second generator is formed from a fluted tube within a conventional tube, that is, so called fluted tube-in-tube construction. The fluted tube-in-tube is formed as a helical winding. Hot weak solution from the first generator is used to heat an intermediate solution to desorb refrigerant from the intermediate solution. The intermediate solution flows within the interior of the fluted tube while the hot, weak solution from the first generator flows between the interior of the conventional outer tube and the exterior of the inner fluted tube. Other than this effort, no other attempts have been made to explore the use of coiled helical fluted tubes to improve the desorption process.

Although some effort has been made in the use of fluted and capillary tubes in other arts, these do not suggest the current invention. For example, U.S. Pat. No. 4,438,807 Mathur et al. discloses a heat transfer tube having an internal helical rib to create fluid turbulence within the tube and an external fin that is selectively bent to form passages and openings for reentrant nucleate boiling. The tube is typically used as an evaporator with refrigerant fluid flowing on the outside of the tube. Heat transfer takes place from the fluid flowing within the tube. U.S. Pat. No. 4,589,481 Masson shows a tube heat exchanger having twisted and flattened tubes that are arranged into bundles of tubes having essentially straight and parallel lines. The tubes are arranged with four adjacent tube center lines forming a square or three adjacent tube center lines forming a triangle. The twisted ribs and valleys of the tubes can be aligned so that the distance between tube centers is less than the sum of the radii of the circles that circumscribe the tubes. The degree of flattening can also vary from one end of the tube to the other and a group of tubes may have both left and right screw orientations in the same tube set. U.S. Pat. No. 5,219,021 Edelstein et al. describes an improved design for a heat pipe capillary channel in which the working fluid layer thickness is minimized to afford a large surface area with good, thin film heat transfer. The capillary channels are axially grooved along the length of the tube and provide good evaporation and condensation when used as a heat pipe.

U.S. Pat. No. 5,325,684 Stierlin et al. discloses an absorber than has four spaced-apart concentric windings of oval tubes through which a cooling fluid flows. The concentric coils are arranged in a closed annular cylinder. A divided, weak solution pours over the outside of the oval tubes from the top of the cylinder to form a thin film. A helical space exists between the coil windings that allows for redistribution of weak solution on the coil surfaces as it flows downward. The outer surfaces of the tubes are knurled or have spiralled grooves to enhance good wetting of the tube surfaces. U.S. Pat. No. 3,730,229 D'Onofrio discloses a heat exchanger using helically corrugated tubes. As is apparent, other than the work of Petty et al., little, if anything, has been done to improve mass and heat transfer efficiencies thorough the use of twisted fluted tubes.

Accordingly, it is an object of the present invention to provide an improved twisted fluted tube that better effects a more efficient heat and mass transfer process occurring within the twisted tube.

Another object of this invention is to provide improved liquid-vapor equilibrium conditions within the twisted fluted tube.

Another object of this invention is to improve the heat transfer efficiency on the exterior surface of the twisted fluted tube.

Another object of this invention is to provide a heat and mass transfer device that can be used with a wide variety of heat transfer fluids.

Another object of this invention is to provide a device for the effective direct heat transfer between endothermic and exothermic processes.

Another object of this invention is to provide system components that are simple and easy to manufacture.

Another object of this invention is to provide for improved twisted fluted tube devices that can be more effectively connected to each other.

Another object of this invention is to provide an improved twisted fluted tube configuration for use with evaporation, desorption, absorption, condensation, and rectification processes.

Another object of this invention is to provide improved twisted fluted tubes for use in heat transfer absorption machines.

Other objects of the invention will become more apparent to those with ordinary skill in the art from consideration of the present disclosure.

SUMMARY OF THE INVENTION

The above objects are met with the present invention of an improved twisted fluted tube that features a novel helical capillary flute formed in the interior surface of a thin-wall tube. The capillary flute is formed from a portion of the thin-wall tube by bringing opposing ends or sides of the thin-wall portion in close proximity with each other to define a narrow helical capillary channel slit with the portion of the thin-wall tube between the ends of the portion formed as a generally round helical capillary channel. The narrow capillary slit forms a passage from the helical capillary channel to the interior space of the tube.

The formation of the interior capillary flute in the thin-wall tube results in the formation of a complementary outwardly extending helical crest on the exterior surface of the thin-wall tube. As this helical crest rotates about the longitudinal axis of the thin-wall tube, it defines a crest turn. Adjacent exterior crest turns and the portion of exterior thin-wall tube surface between them define an exterior helical flute or groove. This exterior helical flute gives rise to a complementary crest formed on the interior wall of the thin-wall tube.

As a result, the overall exterior surface of the thin-wall tube consists of alternating helical crests and flutes forming a helical corrugated pattern along the length of the tube. These exterior helical crests and flutes are complementary with interior flutes and crests arranged in a complementary interior corrugated pattern.

The use of an interior helical capillary flute formed as a helical capillary channel with an associated helical capillary channel slit along its length is of special advantage to the present invention. When the tube is placed in a generally horizontal orientation, a volatile liquid or a liquid with a volatile component flowing in the bottom portion of the tube enters the capillary channel through the channel slit and then proceeds to rise in the capillary channel to the top of the tube due to capillary action and then downward as a result of gravitational force. Vaporization or vaporization and boiling of the liquid within the capillary channel cause the liquid to be expelled from the channel through the channel slit in the form of vapor, droplets, or both. The droplets give rise to a large surface area for the further effective transfer of mass between the liquid and vapor state.

Mass and heat transfer is further facilitated by the channel slit which assists in the formation of a thin layer of liquid on the interior surface of the tube (interior tube crests) due to surface wetting effects. Such wetting effects are enhanced, for example, by treating a carbon steel capillary twisted fluted tube with dry air at about 900° F. prior to use. The liquid droplets expelled from the channel slit further increase the effective surface area available for mass transfer as a result of liquid redistribution over the inner surface of the tube.

The helical nature of the flutes and crests further contributes to effective heat and mass transfer by continually mixing the liquid and renewing and exposing fresh liquid surfaces for heat and mass transfer. The swirling and mixing motion of the liquid as it is redistributed coats and recoats the interior flute and crest surfaces of the fluted tube to provide for effective heat transfer through the tube wall.

Heating of the liquid flowing in the capillary twisted fluted tube contributes to mass transfer efficiencies by facilitating rise in the capillary channel and expulsion of the liquid from the channel due to the evaporation or evaporation and boiling actions of the liquid in the capillary channel. Two additional types of boiling can occur: pool boiling can occur in the flowing liquid in the bottom portion of the tube and thin-film boiling can take place on the interior crest surfaces of the tube.

Heating giving rise to these evaporation and boiling effects can be the result of an exothermic process within the tube or it can be the result of external tube heating by a heat transfer fluid flowing over the external surface of the capillary twisted fluted tube or by an exothermic process taking place on the external surface of the capillary twisted fluted tube.

In one particular embodiment of this invention, external heating is directed to one side of the capillary twisted fluted tube. This allows the liquid to rise in the capillary on the cooler side of the tube without undue loss of liquid due to evaporation or evaporation and boiling while facilitating the expulsion of liquid as vapor and/or droplets through the helical channel slit on the other (hot) side of tube.

The present invention also features the formation of windings of coils of a capillary twisted fluted tube to effect space saving advantages. Another feature is the use of an enclosing cylinder, annular cylinder, or second tube to further achieve advantages in heat transfer efficiencies with the exterior surface of the fluted tube. Typically the capillary twisted fluted tube is formed as a plurality of coils about a coil centerline axis with the coils juxtaposed one to the next in a generally annular composite form. The capillary twisted fluted tube may be first enclosed in a second tube and then formed into a winding or the winding may be formed first and then enclosed in a cylinder or annular cylinder.

When enclosed in a second tube, further heat transfer efficiencies are achieved by contacting the exterior crests of the capillary twisted fluted tube with the interior wall of the enclosing tube throughout the rotation of the exterior crest about the fluted tube longitudinal axis. As a result of this contact, heat transfer fluid flowing between the exterior surface of the capillary twisted fluted tube and the interior wall of the enclosing tube is forced or confined to flow in the exterior helical flutes of the capillary fluted tube. As a result of this extended flow path about the capillary twisted fluted tube, heat transfer efficiencies to or from the tube are enhanced.

A winding of contacting adjacent coil crests enclosed in an annular cylinder in which the coil crests are also in contact with both the inner and outer cylinder surfaces of the annular cylinder also provides improved heat transfer efficiency for a heat transfer fluid flowing in the spaces formed by the contacting coil crests. This contact forces the heat transfer fluid to flow across the coils in a direction generally perpendicular to the tube axis and parallel to the coil centerline axis. In this confined cross flow, the heat transfer fluid is forced to separate, combine and mix as it continually encounters crest barriers in its flow through the annular cylinder.

To achieve one sided heating of the capillary fluted tube, it is wound in a helical groove formed in an insulating cylinder and then enclosed in a spaced-apart enclosing cylinder with a heat transfer fluid such as combustion products flowing in the space between the capillary twisted fluted tube winding and the enclosing cylinder. The side of the capillary fluted tube in the groove of the insulating cylinder is relatively cooler and allows for the liquid within the capillary fluted tube to enter the capillary channel through the helical slit and rise in the capillary channel. Near and at the top of the tube and on the opposite side of the tube, heat from the combustion products heats the tube and causes the liquid to boil and spatter from the capillary channel in the form of droplets. Liquid-vapor equilibrium can be further enhanced by filling the interior space of the capillary fluted tube with a packing material such as Rashig rings.

The capillary fluted tube of this invention is particularly effective in evaporation and desorption operations. Moreover, the capillary twisted fluted tube can be enclosed in various enclosing containers, i.e., tubes, cylinders and annular cylinders, to allow the use of different heat transfer regimes for different sections of the capillary twisted fluted tube. This can be of special advantage when used in a heat transfer absorption machine.

For example, the desorber in an absorption machine can be divided into three sections. The lower section can be wound in a groove on an insulating cylinder and heated by passing hot combustion products through the space between the insulating cylinder and a second containing cylinder enclosing the lower section of the capillary twisted fluted tube. The hot weak solution draining from the capillary twisted fluted tube in the lower section can be used to heat the intermediate section of the capillary twisted fluted tube by passing the hot weak solution through an enclosing second tube in confined helical flow or through an annular cylinder in confined cross flow. The upper section of the desorber can be heated with hot hydronic fluid such as aqueous potassium carbonate again by passing the fluid though an enclosing annular cylinder or second tube. Typically the heating fluids are passed through the enclosing annular cylinder or tube in a direction that is counter-current to the flow of liquid within the capillary twisted fluted tube itself.

Further advantages can be achieved with a capillary fluted tube desorber by combining it with an absorber that is also divided into multiple sections for cooling with different heat transfer fluids passing through enclosing annular cylinders or tubes. Thus the lower section of a fluted absorber tube can be cooled with a hydronic fluid passing through an enclosing annular cylinder or second tube in a confined counter-current helical flow regime. The intermediate section can be cooled by passing the cold strong solution leaving the fluted tube at the bottom of the lower section of the absorber through an annular cylinder or second tube enclosing the intermediate section of the absorber. The upper section of the absorber can be cooled with a hydronic fluid passing in confined flow through an enclosing annular cylinder or second tube.

Additional advantages can be achieved when the operating temperature ranges of the absorption machine absorber and desorber overlap. For example, the hydronic fluid used to heat the upper desorber section is relatively cool on leaving the desorber and can be used to cool the upper absorber section during which process it acquires heat that can be used in turn to heat the upper desorber section in closed loop fashion. Alternatively some of the strong solution from either the absorber tube outlet or from the intermediate section enclosing annular cylinder or tube can be used also to cool the upper absorber section and then heat the upper desorber section before being routed to the inlet of the capillary fluted tube desorber. By using annular cylinders to enclosed the upper desorber and absorber sections, space and heat transfer efficiencies can be gained by assembling the annular cylinders in concentric fashion about a common axis.

In yet another heat exchange arrangement, an exothermic process can be carried out in the enclosing container surrounding the capillary twisted fluted tube while an endothermic process takes place within the capillary twisted fluted tube. Alternatively, the endothermic process can be carried out in the enclosing container surrounding the capillary twisted fluted tube while the exothermic process is carried out within the capillary fluted tube. Such arrangements allow for the direct heat exchange from one process to the other without the use of an intermediate heat transfer fluid. Illustrative exothermic (heat generating) processes include absorption, condensation, or rectification, the heat from which can be transferred directly to one or more endothermic (heat requiring) processes such as desorption or evaporation. The enclosing container can be a cylinder, an annular cylinder or a second tube. The enclosing container can be spaced apart from or in contact with the capillary fluted tube to give a wide variety of configurations in which the process carried out in the space between the outer surface of the capillary twisted fluted tube and the enclosing container can take place. In configurations using a second tube as the enclosing container, the tube may be smooth, an open twisted fluted tube, or a capillary twisted fluted tube. When either an open or a capillary twisted fluted tube are used as the enclosing tube, the rotation of the exterior helical crest may be in the same or in the opposite direction as the exterior crest of the enclosed capillary twisted fluted tube.

The foregoing and other advantages of the invention will become apparent from the following disclosure in which one or more preferred embodiments of the invention are described in detail and illustrated in the accompanying drawings. It is contemplated that variations in procedures, structural features and arrangement of components may appear to a person skilled in the art without departing from the scope of or sacrificing any of the advantages of the invention.

Figure 1:
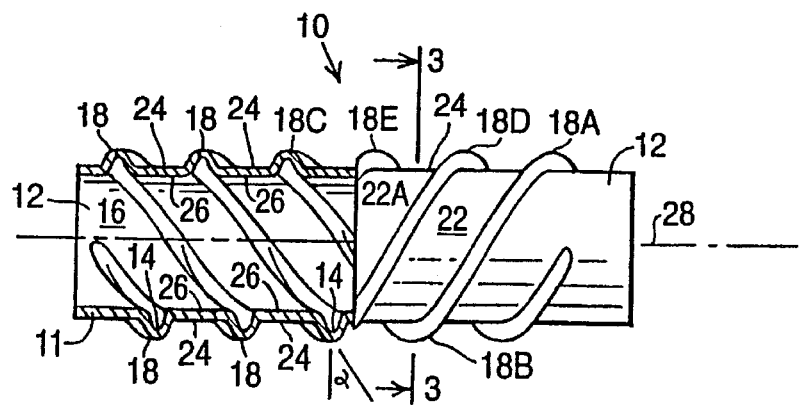
FIG. 1 is a view partly in elevation (right portion) and partly in longitudinal section (left portion) taken through a conventional twisted fluted tube.

In describing the preferred embodiment of the invention which is illustrated in the drawings, specific terminology is resorted to for the sake of clarity. However, it is not intended that the invention be limited to the specific terms so selected and it is to be understood that each specific term includes all technical equivalents that operate in a similar manner to accomplish a similar purpose.

Although a preferred embodiment of the invention has been herein described, it is understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalents thereof.

DETAILED DESCRIPTION OF THE INVENTION AND BEST MODE FOR CARRYING OUT THE PREFERRED EMBODIMENT

Because of the complexity of this system, identical reference numerals are used for similar components shown in the various drawings. This however is not meant to imply that the limitations of one embodiment are equally applicable to another embodiment nor is it intended that a particular component be limited to the features shown in any one drawing. Moreover, because various aspects of the invention come from differing arts with differing terminology the following terms are defined as follows in order to avoid possible confusion.

The term "strong solution" refers to an absorbent, typically a liquid, that has absorbed a gaseous refrigerant. The term "gaseous refrigerant" is also referred to here less formally and more broadly as a gas, refrigerant, or vapor. The gaseous refrigerant and the absorbent are referred to collectively as the "solution pair." Solution from which gaseous refrigerant has been expelled is, by contrast, a "weak solution" in that it holds a lesser ratio of gaseous refrigerant to absorbent.

For example, water can serve as an absorbent and pick up (absorb) ammonia (gaseous refrigerant) to form a strong solution. Water and ammonia are referred to as the solution pair. The strong solution resulting from absorption of ammonia by water has a higher ratio of gaseous refrigerant to absorbent than a solution from which the gaseous refrigerant that has been desorbed (gaseous refrigerant expelled), i.e., a weak solution. As used here, the terms "desorber" and "generator" are synonymous and refer to the apparatus in which a desorption process occurs.

As used here, the generic term "heat transfer fluid" is any fluid to or from which heat can be transferred. Such a fluid can include, but is not limited to, 1) absorption machine process fluids such as the strong solution, weak solution, absorbent, and refrigerant in both the gaseous and condensed (liquid) state, 2) hydronic fluids, 3) combustion products, 4) air, 5) water, and 6) solids, especially fluidized solids. "Hydronic fluids" are heat transfer fluids that do not come in contact or mix with process fluids and are used in a closed system to transfer heat from one portion of a system to another (e.g., absorber to desorber) or from or to a component external to the system (e.g., 1) from an external heat source to the desorber, 2) from an absorber to an external radiator (heat exchanger) for discharge to the environment or to the living space for heating, or 3) from a load such as a living space to the evaporator for cooling). Examples of hydronic fluids include water, steam, aqueous solutions of sodium chloride salt (brine), aqueous solutions of potassium carbonate, and aqueous solutions of ethylene glycol and water (antifreeze). Hydronic fluids are also known as "working fluids." The term "combustion products" is a specie of the generic term "heat transfer fluid" and refers to the resulting mixture formed from the reaction of a fuel and an oxidizing agent. The term "combustion products" can include solids such as ash, liquids such as water, and gases such as steam and carbon dioxide. The term also includes any unreacted fuel and oxidizing agent remaining after combustion as well as any material that does not directly enter into the combustion reaction as, for example, nitrogen when air is used as the oxidizing agent. When a fuel such as natural gas and an oxidizing agent such as air is used as the oxidizing agent, the resulting combustion products can also be referred to as "flue gas" or "combustion gas." The term "gas" as used in conjunction with flue gas or combustion gas is not to be confused with the term "gas" as used in conjunction with the gaseous refrigerant and absorbent. The meaning of the terms "gas" and "vapor" are to be taken in the context in which they are used.

The term "thin wall" as applied to twisted fluted tubes and capillary twisted fluted tubes is a relative rather than limiting term. Generally it is desirable to form twisted fluted tubes from impervious materials of sufficient thinness to give good heat transfer. However, in some situations, e.g., high pressure applications, it may be necessary for the tube wall to be of considerable thickness to meet safety standards. Thus the term "thin wall" refers to a tube wall thickness that affords good heat transfer properties while meeting safety standards for the particular application in which it is used.

It is to be understood that the use of these terms is not intended to limit the present invention to refrigeration devices and absorption machines. Instead, their use is intended to illustrate the present invention in the context of a heat-transfer machine and improvements thereto resulting from the present invention.

Figure 2:
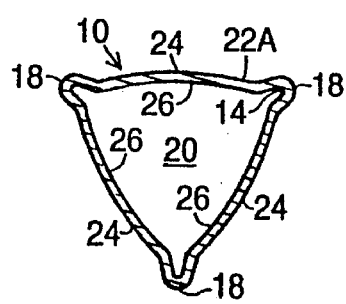
FIG. 2 is a transverse cross-sectional view taken on line 3—3 of FIG. 1 with subsequent background structure omitted.
Figure 3:
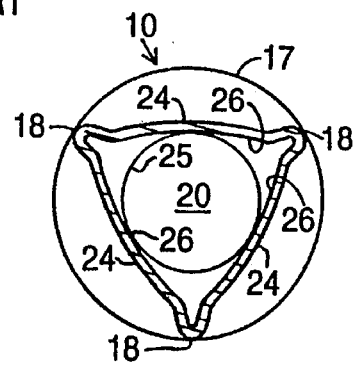
FIG. 3 is a transverse cross-sectional view taken on line 3—3 of FIG. 1.

FIGS. 1–3 illustrate the general features associated with twisted fluted tubes. A thin-wall twisted fluted tube is indicated generally at 10 in FIG. 1. The thin-wall tube 11 has a longitudinal tube axis 28, an exterior surface 22, an interior surface 16, defines an interior tube-wall space 20 (FIGS. 2 and 3), and has two end portions 12,12 of substantially constant cross-sectional size and shape along their lengths. Between the end portions 12,12, tube 10 includes a corrugated portion with parallel and alternating helical crests (ridges) 18 and flutes (grooves) 24.

It is noted that while tube 10 typically has end portions 12,12, such portions are not essential to the present invention, that is, the flutes and crests may extend to the end of tube 10. As shown on the left side of FIG. 1, tube 10 includes a radially outwardly extending interior helical flute 14 that extends for at least a portion of the length of the interior surface 16 of tube 10. Complementary with interior flute 14, tube 10 includes a radially outwardly extending exterior helical crest 18. Each helical rotation of exterior crest 18 about thin-wall tube axis 28 defines an exterior helical crest turn which is shown in FIG. 1 as 18A–18B–18C. Adjacent exterior crest turns, e.g., 18D and 18E, and an exterior surface portion 22A between exterior crest turns 18D and 18E define an exterior helical flute 24. Complementary with exterior helical flute 24, tube 10 includes an inwardly extending interior helical crest 26.

Although it is possible to form twisted fluted tube 10 with a single interior flute 14 that spirals helically about tube axis 28 on the interior surface 16 of tube 11 and which further defines complementary exterior crest 18, exterior flute 24, and interior crest 26; for many purposes it is preferable to form tube 10 with a plurality of interior flutes 14 that give rise to a plurality of complementary exterior crests 18. Twisted fluted tubes with a plurality of interior flutes 14 and complementary exterior crests are typically referred to as multiple-start tubes. Specifically tube 10 in FIGS. 1–3 is a three-start tube. The number of starts is defined as the number of flutes (or complementary crests) intersecting a transverse tube cross section as shown in the cross sectional views of FIGS. 2 and 3. In FIG. 1, crest 18A is the first start; 18D, the second start; and 18E, the third start. As noted previously, 18C is the first start (18A) after a 360° helical rotation about the longitudinal axis 28 of tube 10. The flute pitch is defined here as angle α which is the angle formed by the intersection of flute 14 (or complementary crest 18) with respect to a plane perpendicular (transverse) to the axis 28 of tube 10. When angle α is greater than about 45°, tube 10 is referred to as a longitudinal twisted fluted tube. Generally a longitudinal crest orientation is preferred to effect better "confined cross flow" over the exterior surface of the tube.

FIG. 2 shows a transverse cross section through FIG. 1 taken along line 3—3 of FIG. 1. The structural details immediately beyond the transverse plane have been omitted to illustrate better the details of the cross section at the transverse plane. As evident, interior helical flute 14 is open to interior tube-wall space 20 and is complementary with exterior helical crest 18. Adjacent tube crests 18 and exterior surface portion 22A define exterior flute 24 which is open to the exterior space and which is complementary with interior crest 26. FIG. 3 is a transverse section through line 3—3 of FIG. 1 showing the background structure of the fluted tube. Specifically it is noted that circle 17 is the two-dimensional projection of the apex of crest 18 as the crest helically rotates about longitudinal tube axis 28. Similarly circle 25 is the projected apex of crest 26 as the crests helically rotates about longitudinal tube axis 28. Circles 17 and 25 are projections of the three dimensional structure and do not close flutes 14 or 24. The formation, structure and use of twisted fluted tubes are more fully detailed in U.S. Pat. No. 3,730,229 and U.S. Pat. No. 5,539,654 all of which are incorporated herein by reference as if completely written herein.

FIGS. 4–7 show a capillary twisted (helical) fluted tube indicated generally at 30 according to the present invention. With the exception of the capillary tube flute 34 and complementary crest 38, the overall capillary twisted fluted tube configuration is generally similar to the twisted fluted tube 10 described previously with respect to FIGS. 1–3. Capillary twisted fluted tube 30 comprises a thin-wall tube 31 with a longitudinal tube axis 48. Thin-wall tube 31 defines an interior tube-wall space 40. Tube 31 has at least one interior helical capillary tube flute 34 formed at least in part to define a helical capillary channel 35. Interior helical capillary tube flute 34 extends for at least a portion of the length of the interior surface 36 of thin-wall tube 31. Tube 31 may also have end portions 32A, and 32B of substantially constant cross-sectioned size and shape along their lengths. Between end portions 32A and 32B, tube 31 includes a corrugated portion with parallel and alternating exterior helical crests (ridges) 38 and exterior helical flutes (grooves) 44.

Figure 4:
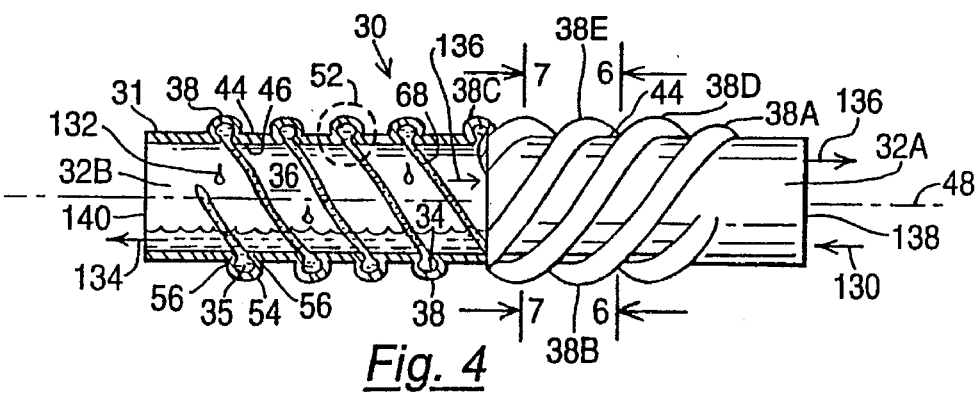
FIG. 4 is a view partly in elevation (right portion) and partly in longitudinal section (left portion) of the capillary twisted fluted tube of this invention.
Figure 5:
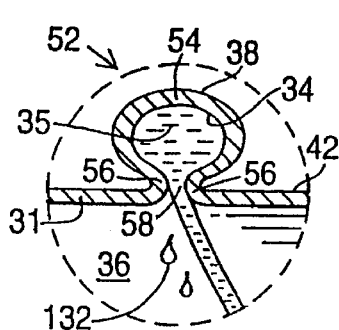
FIG. 5 is an enlargement of portion 52 of FIG. 4 to illustrate more fully the structure of the capillary tube flute of the capillary twisted fluted tube of this invention.

A portion 52 of FIG. 4 is enlarged and shown in FIG. 5. The portion of thin-wall tube 31 forming helical capillary flute 34 has a center section 54 and opposing side sections 56,56, with the opposing side sections 56,56 of the portion of the thin-wall tube 31 being in close proximity to each other in order to form and define a narrow helical capillary channel slit 58. The center section 54 of the portion 52 of the thin-wall tube 31 is formed as a helical flute (groove) 34 that defines helical capillary channel 35. The narrow helical capillary channel slit 58 forms a passage from the helical capillary channel 35 to said interior tube wall space 40.

Figure 6:
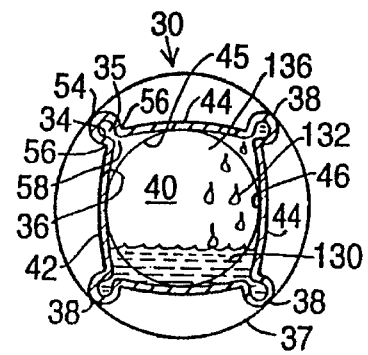
FIG. 6 is a transverse cross-sectional view taken along line 6—6 of FIG. 4.
Figure 7:
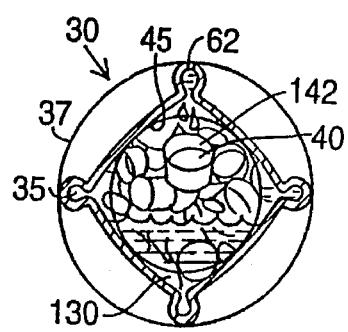
FIG. 7 is a transverse cross-sectional view taken along line 7—7 of FIG. 4.

Referring to FIGS. 4–7, the interior helical capillary tube flute 34 is complementary with a radially outwardly extending, exterior helical crest 38 on the exterior surface 42 of thin-wall tube 31. As shown in FIG. 4, each rotation of the exterior helical crest 38 about the thin-wall tube axis 58 defines an exterior helical crest turn 38A–38B–38C. The rotating crest apex of exterior helical crest 38 is shown as outer circle 37 (FIGS. 6 and 7) and may be regarded as defining the outer diameter of the capillary fluted tube. Adjacent external helical crest turns 38D and 38E and exterior surface portion 42A of said thin-wall tube 31 between said adjacent external helical crest turns 38D and 38E define an exterior helical flute 44. This exterior helical flute 44 is complementary with interior helical crest 46 on said interior surface 36 of said thin-wall tube 31. The rotating crest apex of interior helical crest 46 is shown as inner circle 45 (FIGS. 6 and 7) and may be regarded as defining the inner diameter of the capillary fluted tube. Analogous to twisted fluted tubes generally, capillary fluted tubes may also have multiple starts and, as shown in FIGS. 6 and 7, capillary twisted fluted tube 30 is a four-start tube. Similarly capillary fluted tubes have a flute pitch α (angle between the flute and a perpendicular transverse) and when α is greater than about 45°, the tube is referred to as a longitudinal capillary fluted tube. The longitudinal orientation is preferred when effecting confined cross flow over the exterior surface of the tube. Capillary twisted fluted tubes are especially useful when used in mass and heat transfer devices such as desorbers, evaporators, condensers, rectifiers, and absorbers.

Figure 8:
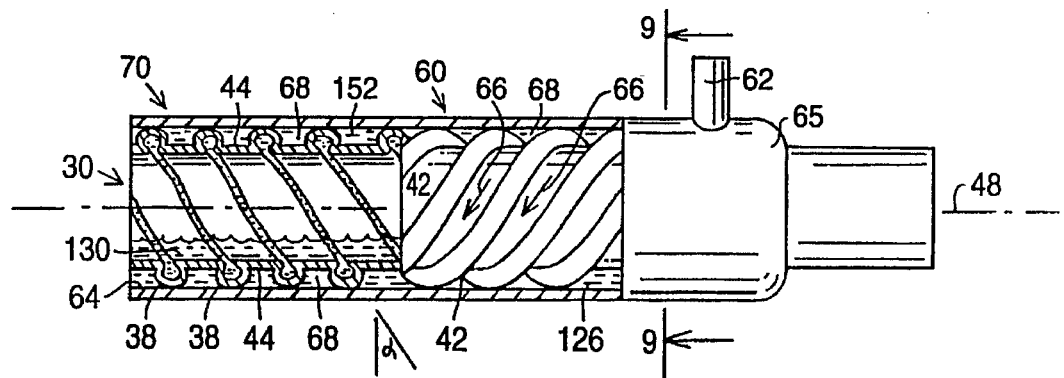
FIG. 8 is a view partly in elevation (right portion) and partly in longitudinal section (left portion) illustrating a capillary twisted fluted tube enclosed in a second concentric tube with the crests of the twisted fluted tube in contact with the interior surface of the enclosing tube over the entire radius of the enclosing tube.
Figure 9:
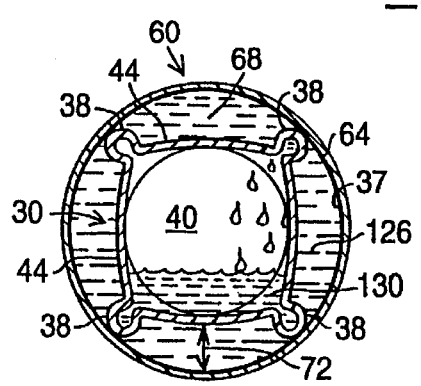
FIG. 9 is a transverse cross-sectional view take on line 9—9 of FIG. 8.
Figure 10:
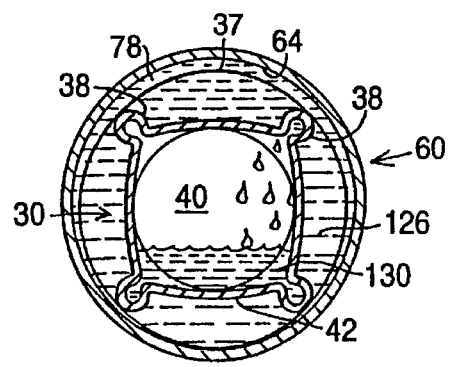
FIG. 10 is a transverse cross-sectional view of another embodiment of a capillary twisted fluted tube-in-tube configuration in which a portion of the apices of the exterior crests of the twisted fluted tube are not in contact with the interior surface of the enclosing second tube.

As shown in FIGS. 8–10, the heat transfer capabilities of the capillary twisted fluted tube 30 can be improved by enclosing, at least partially, capillary twisted fluted tube 30 in a second essentially concentric tube 60. Such a structure is referred to here as "capillary twisted fluted tube-in-tube" or, in abbreviated form, "capillary tube-in-tube" and is designated generally as 70. An opening 62 allows for a fluid (liquid or gas or both) to enter or leave the space between the capillary twisted fluted tube 30 and the enclosing second tube 60. Depending on the application, it is often desirable to enclose the capillary fluted tube 30 in the second tube 60 so that the exterior helical crests 38 are in contact with the interior surface 64 of the enclosing tube 60 (FIGS. 8 and 9) throughout the helical rotation of crest 38 about axis 48. In such a configuration, a fluid designated by arrows 66 in FIG. 8 flows in the helical space 68 formed by the exterior helical crusts 38 and helical flutes 44 of the capillary fluted tube 30 and the interior wall 64 of the enclosing tube 60. Such flow is referred to here as "confined helical flow." In such configuration, heat transfer to or from fluid 66 is accentuated as a result of the long helical path and resulting contact with the exterior tube surface 42 of the capillary fluted tube 30. Additionally heat transfer is influenced by flute (crest) pitch α, the depth 70 (FIG. 9) of the exterior flute 44 (distance from the bottom of flute 44 to the interior wall 64 of enclosing tube 60), and the number of exterior flutes, i.e., flute starts.

As shown in FIG. 10, it is possible to provide additional space 78 between exterior tube crests 38 and interior tube wall 64. Space 78 allows fluid 66 to take a more direct longitudinal path along the exterior surface of twisted fluted tube 30. That is, at least a portion of fluid flows longitudinally (parallel to tube axes 48) between the apex of the spiraling exterior crest 38 as designated by circle 37 and the interior second tube surface 64. In FIG. 10, the apex of crest 38 is allowed to rest on the bottom of the interior surface 64 of the second tube 60 in order to form additional space 78 between the upper portion of tubes 30 and 60. Spacers (not shown) can be provided to obtain a uniform radial spacing between the apex of crests 38 and interior surface 64.

Figure 11:
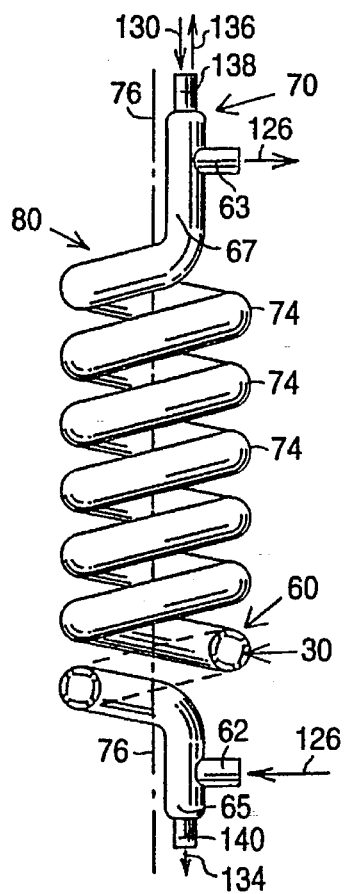
FIG. 11 is an elevational view of a capillary twisted tube-in-tube helical winding with a partial cross section to illustrate the enclosed capillary twisted fluted tube.

Often it is desirable to use gravitational force to effect the flow of liquid within the capillary fluted tube 30 or within the space 68 (or space 68 and 78) between the capillary fluted tube 30 and the enclosing tube 60 or both. Although this can be accomplished by elevating one end of the capillary twisted fluted tube 30 that serves as a fluid inlet or the end of the enclosing tube 60 serving as an inlet and allowing the fluid to drain to the opposite end, in many applications the length of such a tube becomes unwieldy. In such situations, it is desirable to form the tube as a capillary twisted fluted tube-in-tube winding such as shown in FIG. 11 and designated generally as 80.

The capillary twisted fluted tube-in-tube winding comprises a capillary twisted fluted tube-in-tube configuration 70 have a capillary twisted fluted tube 30 enclosed in a second tube 60 and formed as a plurality of coils 74 formed about a coil centerline axis 76. The coils 74 are juxtaposed one to the next in a generally annular composite form. As used here, the term juxtaposed means that the coils 74 are side by side with each other and that adjacent coils can either be in contact with each other or spaced-apart from each other. As shown in FIG. 11, the juxtaposed coils are in a spaced apart relation. The enclosing tube 60 typically has a first opening 62 at one end 65 and a second opening 63 at the opposite end 67 for the entrance and exit of a heat transfer fluid. Flow of the heat transfer fluid can be in either direction within enclosing tube 60, that is, from first opening 62 to second opening 63 or from second opening 63 to first opening 62.

Figure 14:
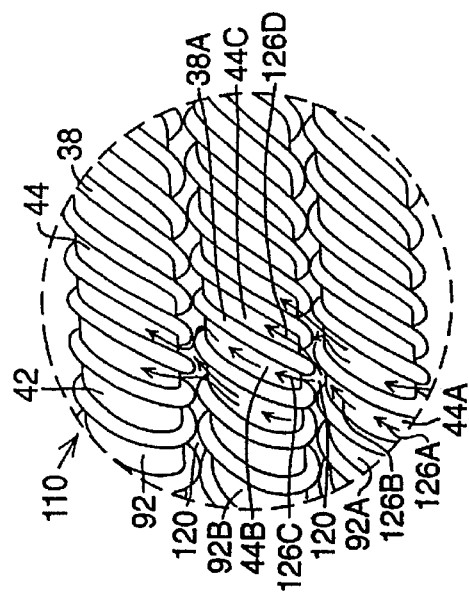
FIG. 14 is an enlargement of portion 110 of FIG. 13 to illustrate more fully the flow between and among contacting tube coils and enclosing inner and outer cylinder walls.
Figure 15:
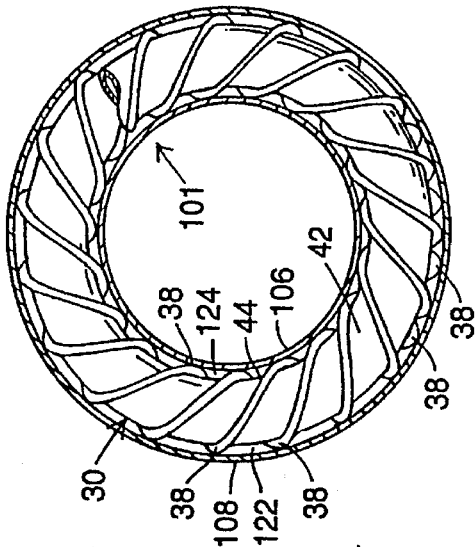
FIG. 15 is a cross section bottom view of a coil winding enclosed in an annular cylinder taken along line 15—15 of FIG. 13. Only a portion of the crests of subsequent overlying coils are shown for drawing clarity.
Figure 13:
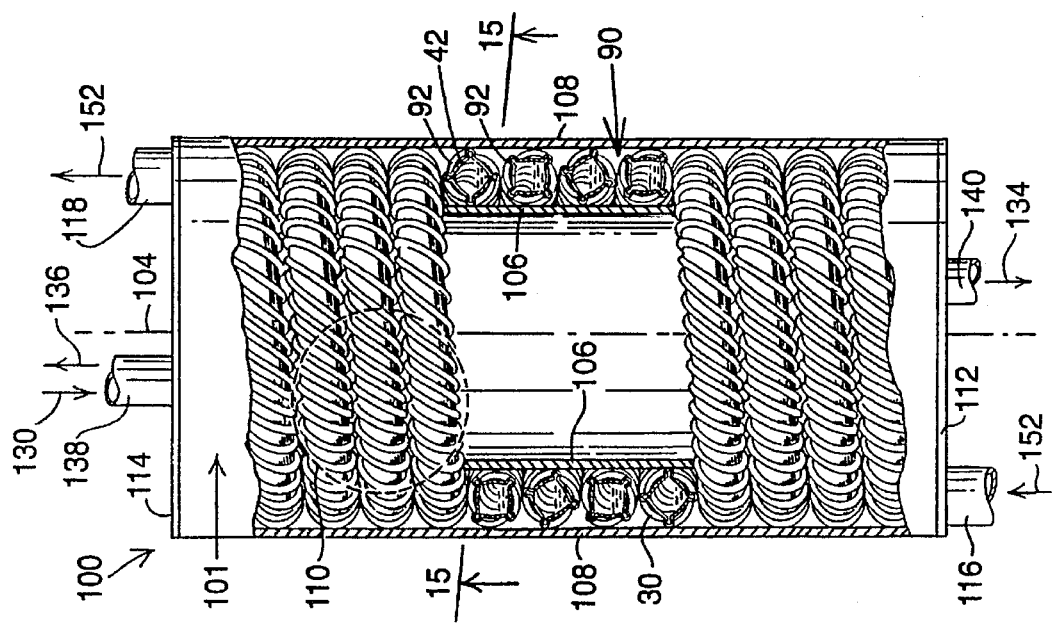
FIG. 13 is an elevational view with a cut-away partial cross section of an annularly enclosed capillary twisted fluted tube helical winding with the coils of the capillary fluted tube winding in contact with each other and with the inner and outer annular cylinder walls.
Figure 12:
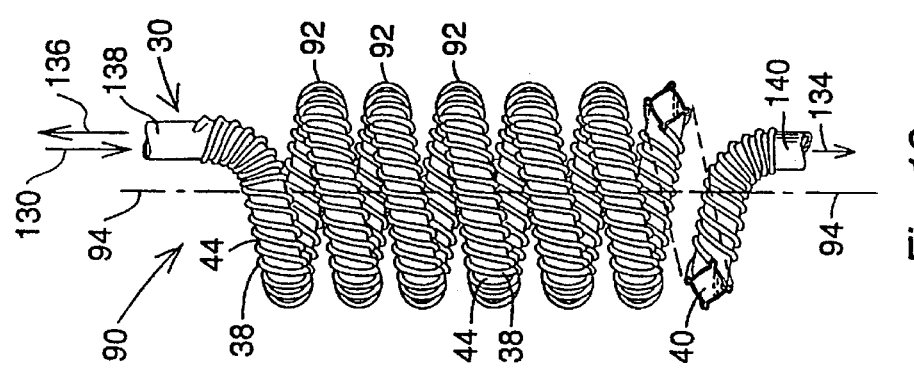
FIG. 12 is an elevational view of a capillary twisted fluted tube helical winding with a partial cross section to illustrate the interior capillary twisted fluted tube.

FIGS. 12–15 show additional embodiments of the present invention based on a capillary twisted fluted tube winding (FIG. 12) and the enclosure of such a winding in a cylinder and especially an annular cylinder (FIGS. 13–15). As with the tube-in-tube winding 80 shown in FIG. 11, it is often desirable to form a winding 90 from a capillary fluted tube 30. As shown in FIG. 12, winding 90 is formed as a plurality of coils 92 about a coil center-line axis 94 with the coils juxtaposed one to the next in a generally annular composite form. Juxtaposed coils 94 may either be in contact with each other or spaced apart from each other.

FIG. 13 shows a capillary twisted fluted tube winding 90 enclosed in a cylinder 102 and designated generally as 100. Cylinder 102 has a center-line axis 104 that is parallel with the coil center-line axis of capillary twisted fluted tube winding 90. Although in many applications the coil center-line axis and the cylinder center-line axis are coextensive, it is to be realized that in some applications, such as those shown in FIGS. 16–17, it is only necessary that the two axes be essentially parallel to each other.

As further shown in FIG. 13, the capillary fluted tube winding 90 is enclosed in an annular cylinder heaving an inner cylinder wall 106 and an outer cylinder wall 108. The annular cylinder is typically closed with a first end 112 and a second end 114. A first opening 116 and a second opening 118 are provided to allow for the flow of a fluid, typically a heat transfer fluid, through the annular cylinder. The coils 92 of the capillary fluted tube winding 90 may be positioned within cylinder 102 in a wide variety of ways: 1) coils 90 may be spaced apart from each other, 2) they may be in contact with each other, 3) they may be in contact with the inner cylinder wall 106, 4) the outer cylinder wall 108, or 5) both cylinder walls 106 and 108. In many applications and as shown in FIG. 13, it is desirable to have adjacent coils 92 of winding 90 in contact with each other and also in contact with both interior wall 106 and exterior wall 108. Such contact gives rise to a unique flow pattern as fluid flows from one end of the annular cylinder to the other end.

In FIG. 13, fluid enters the annular cylinder through opening 116 and exits through opening 118 with the flow pattern being more fully shown in FIGS. 14 and 15. Generally the flow is in an upward direction parallel to the coil center-line axis 104. To appreciate the flow patterns, it is to be realized that when crests of adjacent coils 92 are in contact with each other, openings 120 are formed between adjacent coils 92 by the surface of the outer crests 38 and outer flutes 44 of these coils. In addition, and as shown in FIG. 15, openings 122 are formed by the exterior cylinder wall 108 and the surface of the outer flutes 44 and outer crests 38 of the capillary fluted tube 30. Similarly openings 124 are formed by the interior cylinder wall 106 and the surface of outer flutes 44 and outer crests of capillary fluted tube 30.

As shown in FIG. 14, fluid portion 126A flows upward in opening 122 between flute 44A of coil 92A and exterior wall 108 (opening 122 is more fully shown in FIG. 15). On reaching the top of coil 92A, a portion of the fluid 126B enters opening 120 between coils 92A and 92B and continues its upward path in opening 124 (between coils 92B and interior cylinder wall 106; and again shown more fully in FIG. 15). Another portion of fluid 126C flows between flute 44B and exterior cylinder wall 108. A third portion 126D, also divided by crest 38A, flows between flute 44C and exterior cylinder wall 108. As is apparent, the flow through the annular cylinder in device 100 is quite tortuous and convoluted as well as being subjected to constant division and remixing as the flow progresses from one end of the annular cylinder to the other. Such a flow is here termed "confined cross flow" and provides excellent heat transfer characteristics between the heat transfer fluid 126 and the capillary fluted tube 30. As noted previously for tube-in-tube devices, heat transfer is also influenced by flute pitch α, exterior flute depth, and the number of flute starts.

Mass transfer occurs in most separation processes in which gases and liquids are involved. When a pure liquid is evaporated, mass is transferred to the gas phase. Desorption is the transfer of mass from a strong solution (gas dissolved in a liquid) to a gas (vapor) stream. The remaining pure liquid is termed a "weak solution." In addition, a transfer surface is used to transfer heat from or to a heat transfer fluid in order to effect the mass transfer. In evaporation and desorption, heat is transferred from a heat transfer fluid to the liquid phase.

Referring to FIG. 4, the mass and heat transfer function of the present invention is further illustrated. A liquid enters the interior space 40 of capillary fluted tube 30 through an inlet or opening 138 at tube end 32A. Inlet 138 is elevated somewhat above outlet or opening 140 at tube end 32B allowing liquid 130 to flow from end 32A to 32B under the influence of gravitational force. As the liquid flows in capillary twisted fluted tube 30, it enters helical capillary channel 35 through slit 58 and rises in capillary channel 35 from the bottom of tube 30 to the top of the tube 30 as a result of capillary force and then downward as a result of gravitational force. As the liquid travels in the capillary channel 35, it is expelled from capillary channel slit 58 in the form of vapor and/or droplets 132. Expulsion is accomplished as a result of vaporization or vaporization and boiling of the liquid in capillary channel 35. Vaporization or vaporization and boiling is a result of heat generation within tube 30 or the application of heat to the exterior surface 42 of tube 30 from any useable source. The small droplet size and associated high surface area per unit volume of liquid facilitates the transfer of gas (vapor) 136 from the liquid to tube space 40 above the flowing liquid 130. Vapor or gas 136 is typically removed from tube 30 through liquid inlet 138. When the liquid 130 is a strong solution, the transfer of absorbed gas 136 from the strong solution 130 results in the flow of weak solution 134 (solution relatively low in absorbed gas) from outlet 140 of tube 30. Generally liquid 130 occupies a small portion of the total tube space in order to allow liquid droplets 132 to reach equilibrium with the vapor 136 above the liquid level. As shown in FIG. 7, tube space 40 can be filled with a packing material such as Rashig rings 142, Berl saddles, intalox saddles, shoe eyelets, twisted tape, Tellerette or Pall rings to further facilitate liquid-vapor equilibrium.

Figure 16:
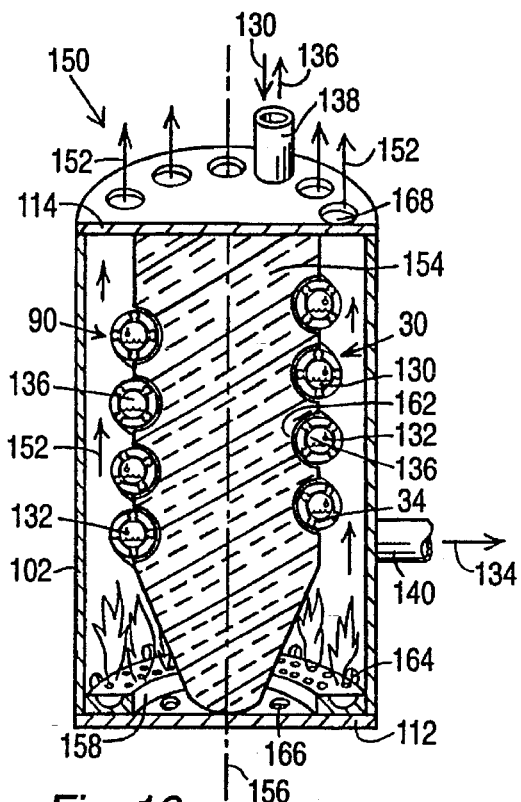
FIG. 16 is a cross-sectional perspective view of a heat and mass transfer device using combustion products for heating a capillary fluted tube winding.
Figure 17:
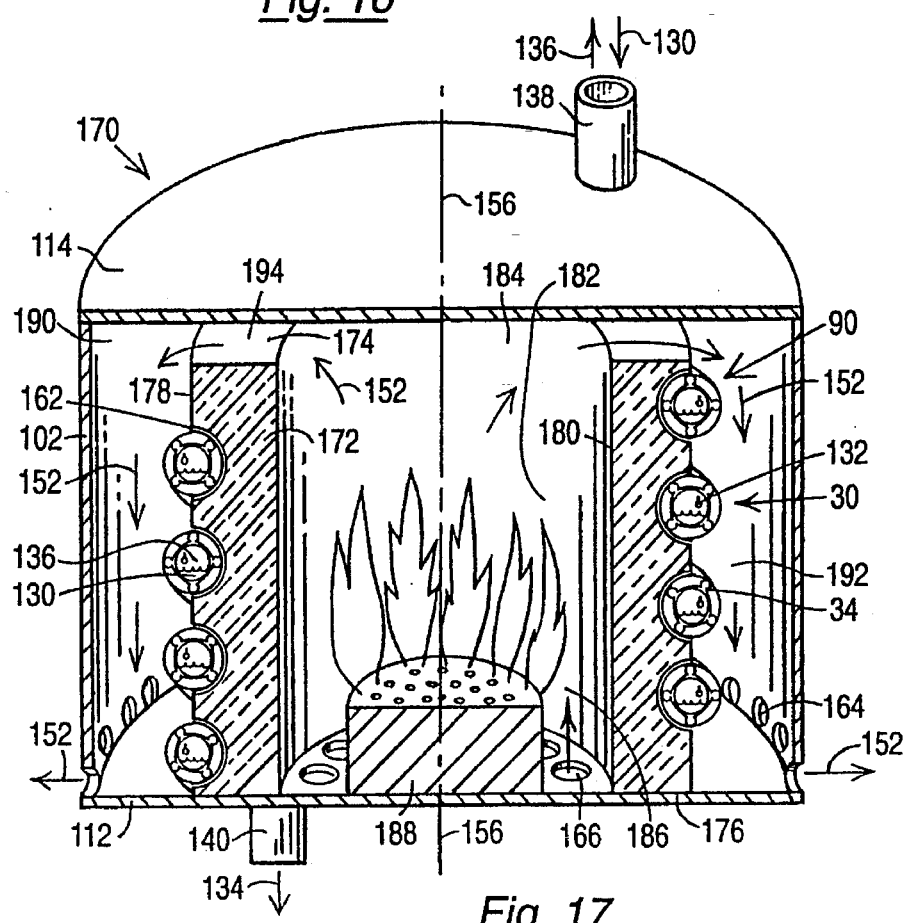
FIG. 17 is a cross-sectional perspective view of an alternate embodiment of a heat and mass transfer device using combustion products for heating a capillary fluted tube winding.

FIGS. 16 and 17 illustrate various configurations for effective heat transfer from a fluid such as combustion products 152 to a capillary twisted fluted tube 30 formed as a winding 90. FIG. 16 shows a heat transfer configuration generally designated as 150 in which a twisted fluted tube winding 90 is formed about a cylinder 154 with the cylinder 154 and coil winding 90 having a parallel and coextensive center-line axis 156. A ring burner 158 at the bottom of the coil winding 90 provides combustion products to heat coil winding 90 and transfer heat to a liquid 130 entering at inlet 138 and flowing in capillary twisted fluted tube 30. Such heat transfer results in the formation of a vapor 136 which flows upward in tube 30 and exits through inlet 138.

To further improve heat and mass transfer efficiencies, a helical groove 162 is formed in cylinder 154 which is composed of a heat insulating (refractory) material such as silica, fire clay or magnesite. Helical groove 162 receives a portion (one side) of the capillary twisted fluted tube 30 forming winding 90. Interior capillary flute 34 must spiral in the same direction as the overall flow of liquid 130 in tube 30. By forming winding 90 in groove 162, one side of tube 30 is protected from the direct heating effect of combustion products 152 while the other side of tube 30 that is in direct contact with the hot combustion products, e.g., flue gas 152. Capillary action and a bubbling-boiling action in helical capillary channel 35 (FIGS. 4–6 and 16) carries a liquid 130 from the bottom to the top of tube 30 on the cooler side of tube 30. Toward the top of tube 30, liquid 130 begins to encounter the heat transferred from combustion products 152. Combustion product heat and gravity cause liquid 130 to sputter out of capillary channel 35 through helical slit 58 as droplets 132. Small droplets 132 quickly reach equilibrium with vapor 136. Remaining liquid after mass transfer to the vapor phase collects at the bottom of tube 30 where it again enters the capillary channel 35 through slit 58 to repeat the cycle.

As shown in FIG. 7, capillary fluted tube 30 may be filled with a packing material such as Rashig rings 142. As liquid 130 sputters and boils out of capillary channel 35 through slit 58, it wets the packing further promoting equilibrium with vapor 136 flowing to outlet 138 (FIGS. 4 and 16).

To further improve heating efficiencies and as shown in FIG. 16, capillary fluted tube coil winding 90 and insulating cylinder 154 are placed in an enclosing cylinder 102 to direct combustion products 152 over the radially outward extending side of tube 30 of coil winding 90. Cylinder 102 has a first end (bottom) 112 and a second end (top) 114 and an axis that is generally parallel and typically coextensive with coil winding 90 and insulating cylinder 154 center-line axis 156. Openings 164 in the lower part of enclosing cylinder 102 and openings 166 in bottom 112 provide air for fuel combustion while openings 168 serve as a combustion product outlet for combustion products 152.

When embodiment 150 of FIG. 16 is used as a desorber, liquid 130 is in the form of a strong solution which is received into capillary fluted tube 30 at upper inlet 138. As shown, inlet 138 also serves as an outlet for gas 136 desorbed from strong solution 130. Lower outlet 140 serves as an outlet or drain for weak solution 134.

FIG. 17 illustrates another heat transfer embodiment of the present invention using hot combustion products 152 as the heat transfer fluid. This embodiment is designated generally as 170 and typically is used as a desorber. Device 170 comprises an annular insulating cylinder 172 with a helical groove 162 on its outer surface 178 for partially receiving capillary fluted tube 30 of helical winding 90. Winding 90 and insulating annular cylinder 172 have a common parallel and co-extensive axis 156.

The helical winding 90 and associated insulating annular cylinder 172 are at least partially contained in an enclosing cylinder 102 with interior cylinder wall surface 190 and having an upper enclosing end (top) 114, a lower enclosing end (bottom) 112, and a center-line axis that is generally parallel to and typically coextensive with coil winding axis 156. Outlets 164 are provided toward the bottom of cylinder 102 for the exhaust of combustion products 152. Inlets 166 provide air or other oxidizing gas for fuel combustion.

The annular insulating cylinder 172 has a top 174, a bottom 176, an outer surface 178 and an inner surface 180. Inner surface 180 defines a cylindrical center space 182 with an upper portion 184 and a lower portion 186. The lower portion 186 of center space 182 contains burner 188. The inner surface 190 of containing cylinder 102, the outer surface 178 of insulating cylinder 172, the upper enclosing end 114, and lower enclosing end 112 define an outer annular space 192. Upper enclosing end 114 and the top 174 of insulating cylinder 172 define an upper insulating cylinder space 194. The annular outer space 192, the upper annular insulating cylinder space 194 and insulating annular cylinder center space 182 form an interconnected combustion product passage for the flow of combustion products 152 from burner 188 to outlets 164 located in the lower portion of containing cylinder 102. The radially outward extending portion of capillary twisted fluted tube 30 of tube winding 90 is heated by the flow of hot combustion products from burner 188 as it flows downward in annular space 192. Such a configuration avoids overheating of helical winding 90 due to radiant heating from the combustion process.

When operating as a desorber, opening 138 serves as a strong solution inlet for receiving strong solution 130 and as a desorbed gas outlet for desorbed gas 136. Opening 140 serves as an outlet (drain) for weak solution 134. Overall operation of capillary fluted tube 30 as a desorber is similar to that described for device 150 of FIG. 16.

In addition to the combustion product heat transfer embodiments in FIGS. 16 and 17, the configuration shown in FIG. 13 can also be used for combustion product heat transfer. In a confined cross-flow regime, capillary fluted tube coils 92 are in contact with each other and with the inner cylinder surface 106 and outer cylinder surface 108. Hot combustion products 152 enters through opening (inlet) 116, flows over around coils 92 in confined cross flow, and leaves through outlet 118. For desorber application, strong solution 130 enters through opening (inlet) 138 and weak solution 134 leaves through outlet 140. Desorbed gas or vapor 136 leaves through opening 138. As with the desorber configurations in FIGS. 4, 6, 7, 16 and 17, strong solution 130 occupies a small portion of interior tube wall space 40 (FIG. 6).

In addition to the use of combustion products to heat a capillary fluted tube winding 90 formed in an annular cylinder so as to provide confined cross-flow of the combustion products over the coil winding, a wide variety of other flow patterns and heating fluids may be used in conjunction with the desorption process. Generally the desorption process is carried out in a capillary twisted fluted tube 30 as illustrated in FIG. 4. For compactness and as noted previously, tube 30 typically is formed into a winding as shown in FIG. 12. Strong solution inlet 138 usually is above the outlet 140 to afford gravitational flow from inlet 138 to outlet 140. The strong solution typically occupies a small portion of tube space 40 (FIG. 6) so that the relative portions of liquid and vapor achieve good mass transfer efficiency (liquid-vapor equilibrium). Liquid and vapor flow rates are also maintained to achieve optimal mass transfer efficiencies and avoid flooding from either entrainment (excess vapor flow) or excess liquid down flow. Desorbed vapor 136 from the strong solution 130 typically flows opposite (counter-current) to the flow of the strong solution and exits through an upper vapor outlet which, as illustrated, is the same as strong solution inlet 138. As vapor is desorbed from the strong solution 130 in the capillary fluted tube 30, it becomes weaker and eventually leaves the fluted tube winding through outlet 140 as weak solution 134 (FIG. 12). Alternatively, the desorbed vapor can flow in a co-current direction, that is, in the same direction as the strong solution. Such an arrangement can be used with a nonvolatile absorbent where absorbent liquid-vapor equilibrium is of less significance but evaporation and evaporation and boiling in the capillary channels remains advantageous.

When placed in an annular cylinder 102, the coils 92 of the capillary fluted tube 30 may be spaced apart from each other (FIGS. 16 and 17) or in contact with each other (FIG. 13). They may be in contact with the inner cylinder 106 of annular cylinder 101 (FIGS. 13 and 15) or they may be spaced apart from the inner cylinder 106 of annular cylinder 101 (not shown). They may be in contact the outer cylinder (108 in FIGS. 13 and 15) or spaced apart from outer cylinder (102 in FIGS. 16 and 17). As is readily apparent, a large number of combinations of coil spacing with respect to juxtaposed coils and inner and outer cylinder walls are contemplated by the present invention. For many applications, a configuration that achieves confined cross-flow, i.e., contacting adjacent coils 92, and coils 92 that contact both the inner and outer cylinders 106 and 108, is used.

Figure 21:
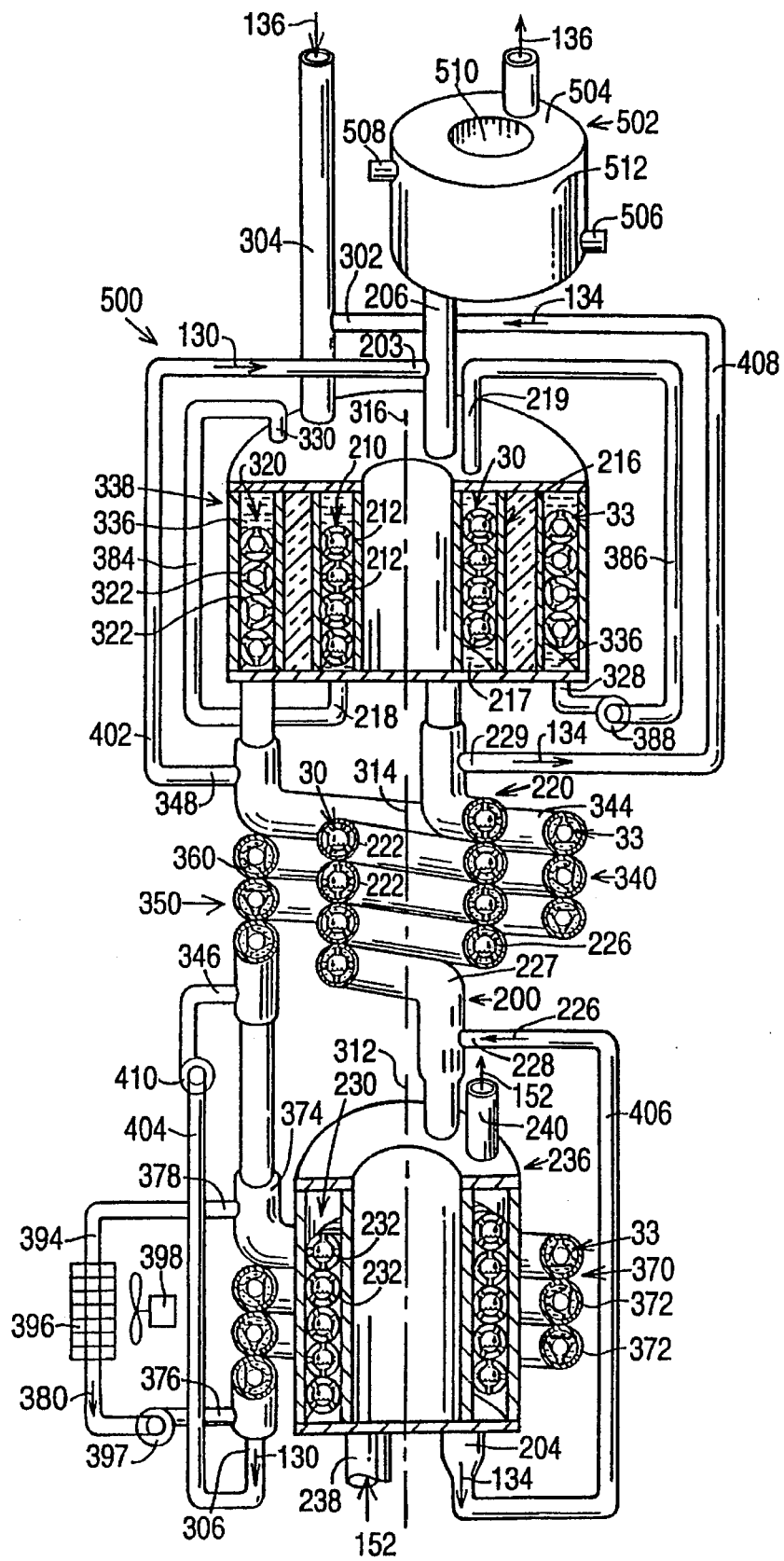
FIG. 21 is a cross-sectional perspective of an absorber and desorber combination according to another embodiment of the present invention with the absorber and desorber each having three windings of coils with each of the windings enclosed in an annular cylinder or the tube forming the winding enclosed in a second tube.
Figure 22:
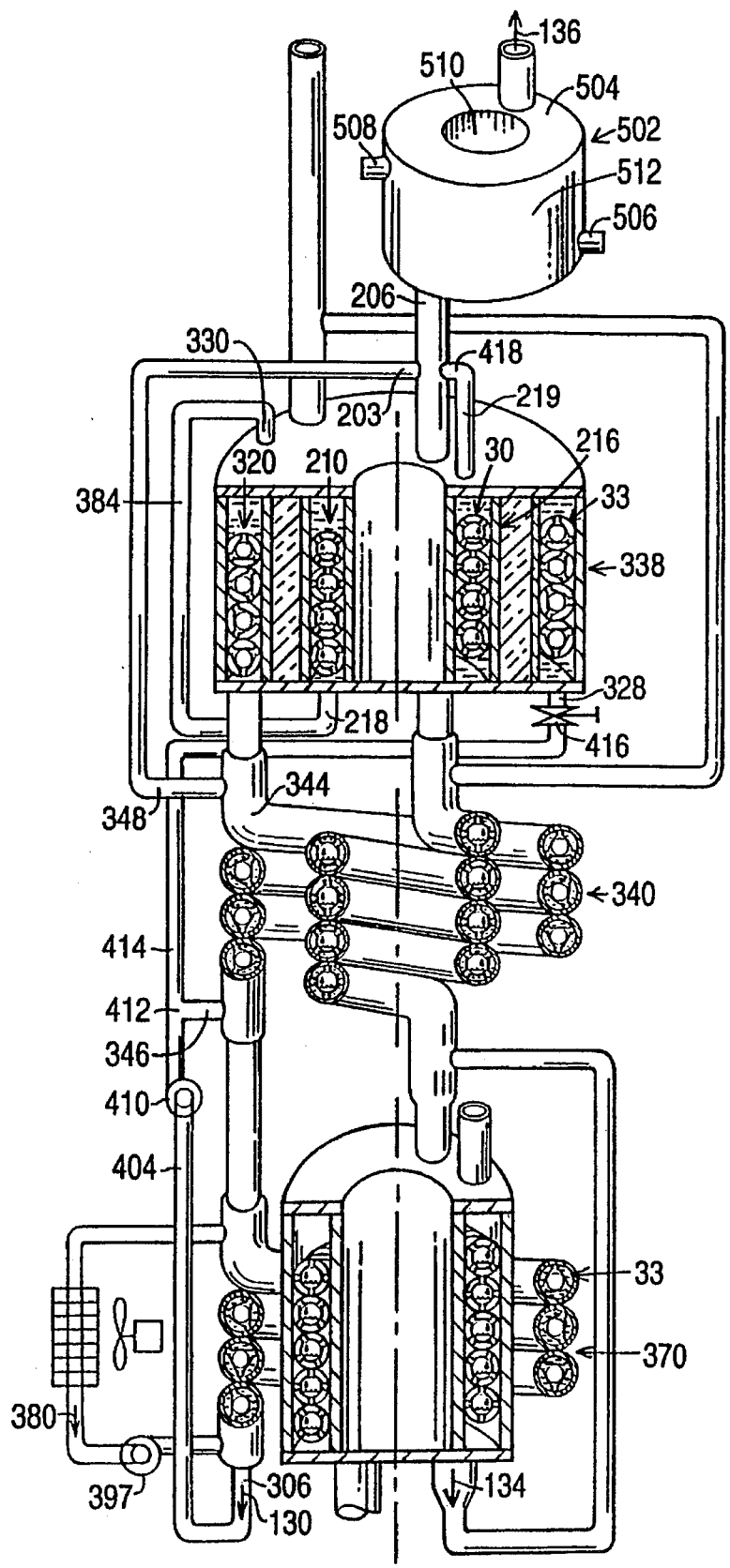
FIG. 22 is another embodiment of the absorber and desorber configuration of FIG. 21 in which a portion of the strong solution from the absorber outlet is used as a heat transfer fluid to cool the upper absorber winding and then to heat the upper desorber winding after which it enters the desorber inlet.
Figure 23:
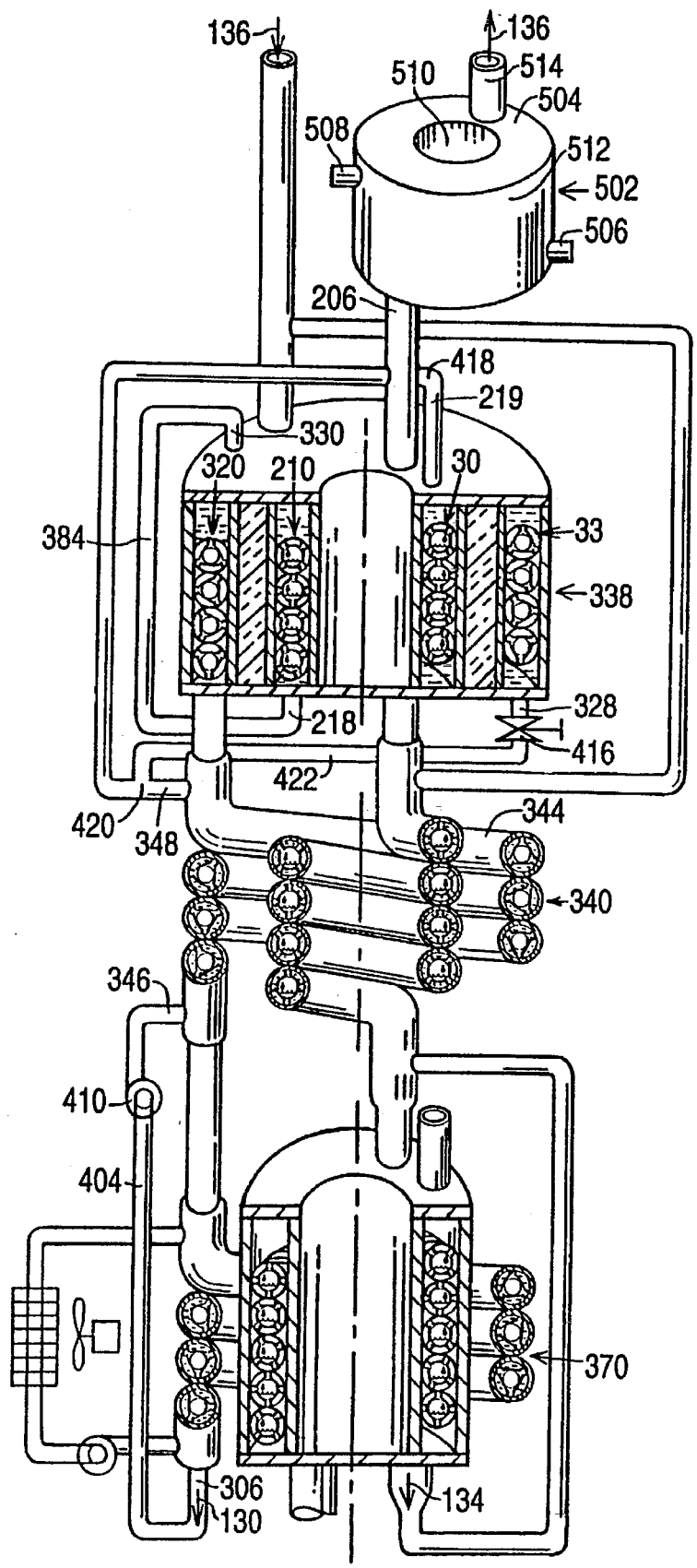
FIG. 23 is another embodiment of the absorber and desorber configuration of FIG. 21 in which a portion of the strong solution from the outlet on the second tube enclosing the absorber tube of the intermediate absorber winding outlet is used as a heat transfer fluid to cool the upper absorber winding and then to heat the upper desorber winding after which it enters the desorber inlet.

In addition, each coil and cylinder wall combination can be used with a wide variety of heat transfer fluids. These include hot combustion products from the combustion of a suitable fuel such as natural gas; hydronic fluids such as steam and hot water, aqueous solutions of ethylene glycol, aqueous potassium carbonate solutions, aqueous brine (salt) solutions and so forth; hot weak solution after it leaves the desorber winding 90 through outlet 140 (FIGS. 4, 12, 13, 16 and 17); and strong solution after it leaves absorber winding 370 (FIGS. 21–23).

Heat transfer fluid flow through the enclosing cylinder (on the outside of desorber tube 30) can be either in an overall direction that is the same as the strong solution in the desorber coil tube, i.e., typically in a downward direction, which here is referred to as co-current flow, or flow can be in an opposite direction to downward strong solution flow in the desorber, i.e., in an upward direction, which is referred to here as counter-current flow. Of the various combinations of heat transfer fluid flow directions and spacing of coils within an annular cylinder, that combination which gives a confined counter-current heat transfer fluid cross-flow as is generally shown in FIG. 13 is preferred for many applications.

As with tube-in-cylinder devices, a number of capillary fluted tube and enclosing tube spacings are possible when enclosing a capillary twisted fluted tube within a second tube (capillary twisted fluted tube-in-tube configuration). A variety of heat transfer fluids and flow patterns may also be utilized. For desorber operation (shown in FIG. 11), strong solution 130 enters through inlet 138 and flows downward within tube 30 taking up heat from the tube wall with accompanying desorption of gas 136 that leaves through opening 138. Weak solution 134 leaves through outlet 140.

As shown in FIGS. 8 and 9, one of the possible capillary twisted fluted tube-in-tube configurations places the exterior helical crest 38 in contact with the interior surface 64 of enclosing concentric tube 60 throughout the helical rotation of crest 38 about longitudinal centerline axis 48. This results in a helical space 68 through which a heat transfer fluid flows in a helical flow pattern about tube 30 in a flow pattern here termed "confined helical flow." In such a flow pattern the longitudinal tube axes 48 of the enclosing tube 60 and the capillary fluted tube 30 are both parallel and coextensive (FIG. 8) as are the radii formed by the rotation of the exterior helical crest (outer crest circle) 37 and the interior surface 64 of enclosing tube 60 (FIG.9).

As shown in FIG. 10, the radius of the interior surface 64 of enclosing tube 60 can be made larger than the outer crest circle 37. If the crest 38 is allowed to rest on the bottom of interior surface 64, an additional space 78 is formed between crest radius 37 and interior wall 64 reaching maximum separation at the top of interior surface 64. In such a configuration, the axes of the capillary fluted tube 30 and the enclosing tube are parallel but not coextensive and heat transfer fluid tends to flow in a path parallel to the axes rather in a confined helical path about capillary fluted tube 30. It is noted that it is also possible to use spacers (not shown) between the capillary fluted tube 30 and the interior surface 64 so that the crests do not contact interior surface 64 at all.

As noted above, a wide variety of heat transfer fluids 126 may be used in the space between the enclosing tube 60 and capillary fluted tube 30. These include combustion products, hydronic fluids, weak solutions and strong solutions. Heat transfer fluid 126 may flow in the same general direction as the liquid 130 in tube 30, e.g., downward, in which case it is termed co-current flow or it may flow generally in a direction opposite to the flow of liquid 130 in which case it is referred to as counter-current flow.

Thus in FIG. 11, liquid 130 flows from top to bottom, that is, from opening 138 to opening 140. If heat transfer fluid 126 flows in through second opening 63 at the second end 67 of enclosing tube 60 and out through a first opening 62 at a first end 65 of enclosing tube 60, the heat transfer fluid is in a co-current flow regime with respect to the flow of liquid within tube 30. On the other hand and, if as shown, heat transfer fluid 126 enters through opening 62 and leaves through opening 63, the flow is referred to as a counter-current flow regime with respect to the flow of fluid within tube 30. When the helical crest 38 is in contact with interior surface 64 throughout its helical rotation so as to afford a confined helical flow in passage 68 about capillary twisted fluted tube 30 and when heat transfer fluid 126 is in a counter-flow regime with respect to liquid 130 within capillary twisted fluted tube 30, the resulting heat transfer fluid flow is referred to here as "confined helical counter-current flow."

Figure 18:
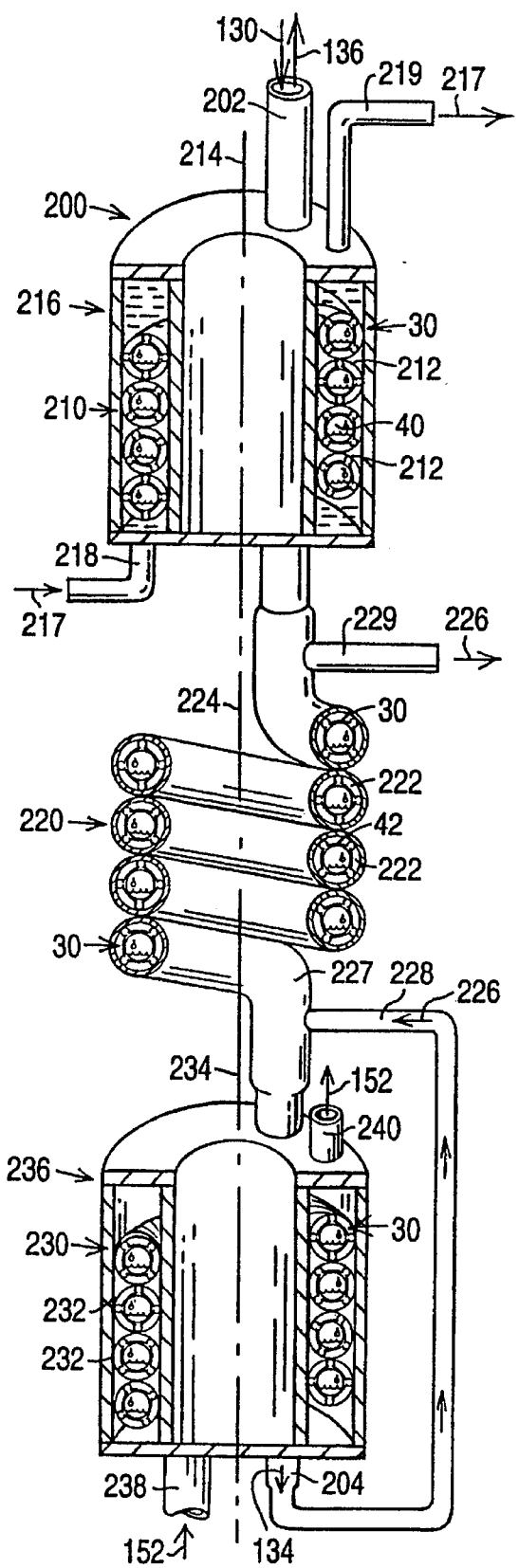
FIG. 18 is a cross-sectional perspective view of a desorber formed as upper, intermediate and lower windings of desorber coils; the upper winding coils are contained in an annular cylinder to achieve confined counter-current cross flow, the intermediate winding coils are contained in an enclosing tube to afford confined helical counter-current flow, and the lower winding coils are contained in an annular cylinder to achieve confined counter-current cross flow.

As shown in FIG. 18, it is often desirable to form a desorber as three or more windings of capillary fluted tubes to take advantage of alternative heating sources (heat transfer fluids) that may be used with each winding. The three winding desorber configuration is designated generally as 200 in FIG. 18.

Desorber 200 is formed from a capillary twisted fluted tube 30 which has been previously described. Capillary twisted fluted tube 30 has an upper strong solution inlet 202 for receiving strong solution 130 and an upper desorbed gas outlet serving as an outlet for desorbed gas from strong solution 130. A separate outlet joining with tube 30 typically is provided (not shown) to join desorber 200 to other components of an operating system. For illustrative purposes, inlet 202 serves as the outlet for gas 136 desorbed from strong solution 130. Weak solution 134 leaves desorber capillary fluted tube 30 through lower desorber outlet 204. Capillary twisted fluted tube 30 is formed as 1) an upper helical winding 210 of desorber coils 212 about coil centerline axis 214; 2) an intermediate helical winding 220 of desorber coils 222 about coil centerline axis 224; and 3) a lower helical winding 230 of desorber coils 232 about coil centerline axis 234. At least a portion of the capillary fluted tube 30 is heated with a useable heat source including, but not limited to, combustion products, steam, hydronic fluids, weak solutions, strong solutions or direct heat transfer from one or more exothermic processes such as absorption, condensation, and rectification. It is to be understood that the centerline axes 214, 224 and 234 may be a single common axis or that each axis and associated winding may have a different position and orientation. Typically it is preferred to have the liquid inlet above any outlets to take advantage of gravitational flow. It is also to be understood that the three windings could be formed as a long, single winding about a common axis with the single winding having separate winding sections functioning in the same manner as described for the upper, intermediate and lower windings illustrated. The various windings of the desorber may be formed from either capillary twisted fluted tubes or open twisted fluted tubes; however, capillary twisted fluted tubes are preferred.

In many applications, the upper desorber winding 210 can be heated with a heat transfer fluid 217 such as a hydronic fluid such as aqueous potassium carbonate or a strong solution that may utilize the liberated heat from an absorption process. Any of the various capillary twisted fluted tube-in-cylinder, capillary twisted fluted tube-in-annular cylinder, or capillary twisted fluted tube-in-tube configurations may be used for heating of upper desorber winding 210. When a capillary twisted fluted tube-in-tube device is used, it is preferably configured to achieve confined helical counter-current flow of the heat transfer fluid in the space between the outer surface 42 of the capillary twisted fluted tube 30 and the inner wall 64 of the enclosing tube as shown in FIGS. 8–11. As shown in FIG. 18, the capillary twisted fluted tube-in-annular cylinder is configured to achieve confined counter-current cross flow as further detailed and explained with regard to FIGS. 13–15. As seen in FIG. 18, heat transfer fluid 217 enters the annular cylinder 216 enclosing upper desorber winding 210 through inlet 218 and leaves through outlet 219. Heat transfer fluid 217 can be a strong solution or a hydronic fluid such as an aqueous solution of potassium carbonate. Potassium carbonate is especially attractive as a hydronic fluid because of its good thermodynamic, transport,-and non-corrosion properties. Concentrations of 10–40 percent are typically used with a 35% solution preferred in order to lower the water freezing point to about −15° F. (−26.1° C.).

The intermediate desorber winding 220 is heated with a heat transfer fluid 226 such as weak solution 134 from desorber outlet 204. As with the upper desorber winding 210, any of the various capillary twisted fluted tube-in-cylinder, capillary twisted fluted tube-in-annular cylinder, or capillary twisted fluted tube-in-tube configurations may be used for the heating of intermediate desorber winding 220. Preferably capillary twisted fluted tube-in-annular cylinder or capillary twisted fluted tube-in-tube configurations are used. The capillary twisted fluted tube-in-annular cylinder device is configured preferably to achieve confined counter-current cross flow of the heat transfer fluid 226 between the outer surface of the capillary twisted fluted tube 42 and the inner and outer walls 106 and 108 of the annular cylinder 101 as further detailed and explained with regard to FIGS. 13–15. As shown in FIG. 18, the capillary twisted fluted tube-in-tube is configured to afford confined helical counter current flow as further detailed and described with regard to FIGS. 8–11. Heat transfer fluid 226 enters tube 227 enclosing the capillary fluted tube 30 forming intermediate desorber winding 220 through inlet 228 and leaves through outlet 229. In some heat transfer machines, the heat transfer fluid 226 used to heat intermediate winding 220 can be the hot weak solution 134 from desorber outlet 204.

Typically the lower desorber winding 230 is heated with a heat transfer fluid such as steam, hot water, or combustion products such as flue gas 152. Any of the various capillary twisted fluted tube-in-tube, capillary twisted fluted tube-in-annular cylinder or capillary twisted fluted tube-in-cylinder configurations may be used. Capillary twisted fluted tube-in-tube devices are configured to afford confined helical counter-current flow as explained with regard to FIGS. 8–11. As shown in FIG. 18, a capillary twisted fluted tube-in-annular cylinder is configured to achieve confined counter-current cross flow as detailed and explained with regard to FIGS. 13–15. A heat transfer fluid such as combustion products 152 enters annular cylinder 236 through inlet 238 and leaves through outlet 240 flowing in a generally upward direction and in counter-current relation to the solution flowing downward in tube 30.

Figure 19:
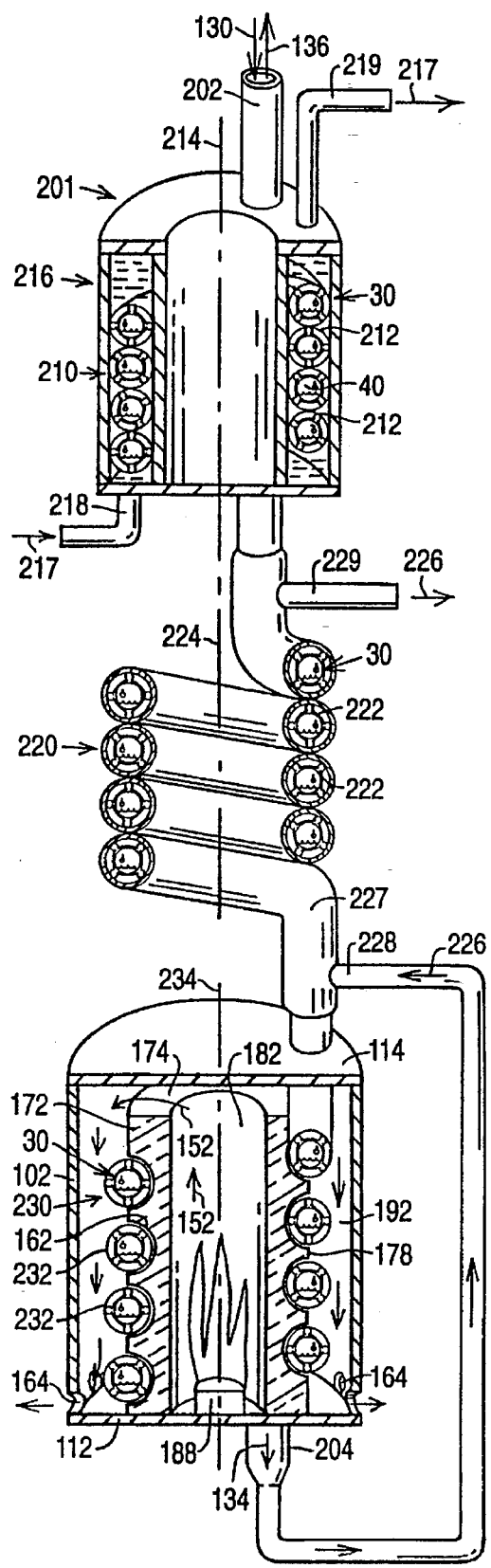
FIG. 19 is a cross-sectional perspective view of a desorber formed as upper, intermediate and lower windings of desorber coils; the upper winding coils are contained in an annular cylinder to achieve confined counter-current cross flow, the tube used to form the intermediate winding of coils is contained in a second enclosing tube to afford confined helical counter-current flow, and the lower winding coils have been wound in a groove on an insulating annular cylinder and contained in a second enclosing cylinder.

FIG. 19 illustrates another embodiment of a three section absorber generally designated 201. The upper and intermediate windings are configured as has been described above for FIG. 18. The lower desorber winding is a tube-in-cylinder configuration in which the juxtaposed coils 232 of winding 230 are spaced apart from each other and from enclosing cylinder 102. The lower desorber winding 230 is wound in a helical groove 162 formed on the exterior surface 178 of annular cylinder 172. Lower desorber winding 230 and annular cylinder 172 are contained in an enclosing cylinder 102 with an enclosing top 114 and bottom 112. A burner 188 is located in the lower portion of the center opening 182 of annular cylinder 172. Combustion products 152 flow upward in the center opening 182 of annular cylinder 172, radially outward over the top 174 of annular cylinder 172, and then downward in the annular space 192 between annular cylinder 172 and enclosing cylinder 102 and radially outward through outlets 164.

As shown in FIGS. 18 and 19, the upper helical winding 210 is contained in an annular cylinder 216 to afford confined counter-current cross flow of heat transfer fluid 217, tube 30 of the intermediate helical winding 220 is contained in an enclosing outer tube 227 to afford confined helical counter-current flow of heat transfer fluid 226 and the lower helical winding 230 is contained in an annular cylinder 236 to achieve confined counter-current cross flow of heat transfer fluid 152 (FIG. 18) or in cylinder 102 to achieve a generally downward unconfined (co-current) flow of heat transfer fluid 152. Lower helical winding 230 is heated with combustion products 152, intermediate helical winding 220 is heated with a heat transfer fluid 227 such as weak solution 134 from the desorber outlet 204, and the upper winding 210 is heated with a heat transfer fluid 217 such as a hydronic fluid, e.g., $K_2CO_3$, or a strong solution, typically from an absorber unit.

Although it is possible to form various sections of the desorber from conventional twisted, open-flute tubing, capillary twisted fluted tubing is preferred throughout. As shown, desorbed vapor is removed from upper desorber strong solution inlet 202. Such a configuration with counter-current vapor flow with respect to strong solution flow is preferred when the absorbent is of a volatile nature and passed to a rectifier. Co-current flow may also be used, especially when the absorbent is of nonvolatile character.

It is also to be realized that the present invention is not limited to the configurations shown. Thus the various sections of the desorber can be enclosed in cylinders, annular cylinders, or second tubes. Heat transfer fluid flow can be either countercurrent or co-current with strong solution flow within the desorber. In addition to the use of heat transfer fluids to heat the desorption process, a heat producing process, such as an absorption process, can be conducted in the enclosing container to afford direct heat transfer to the desorption process.

Figure 20:
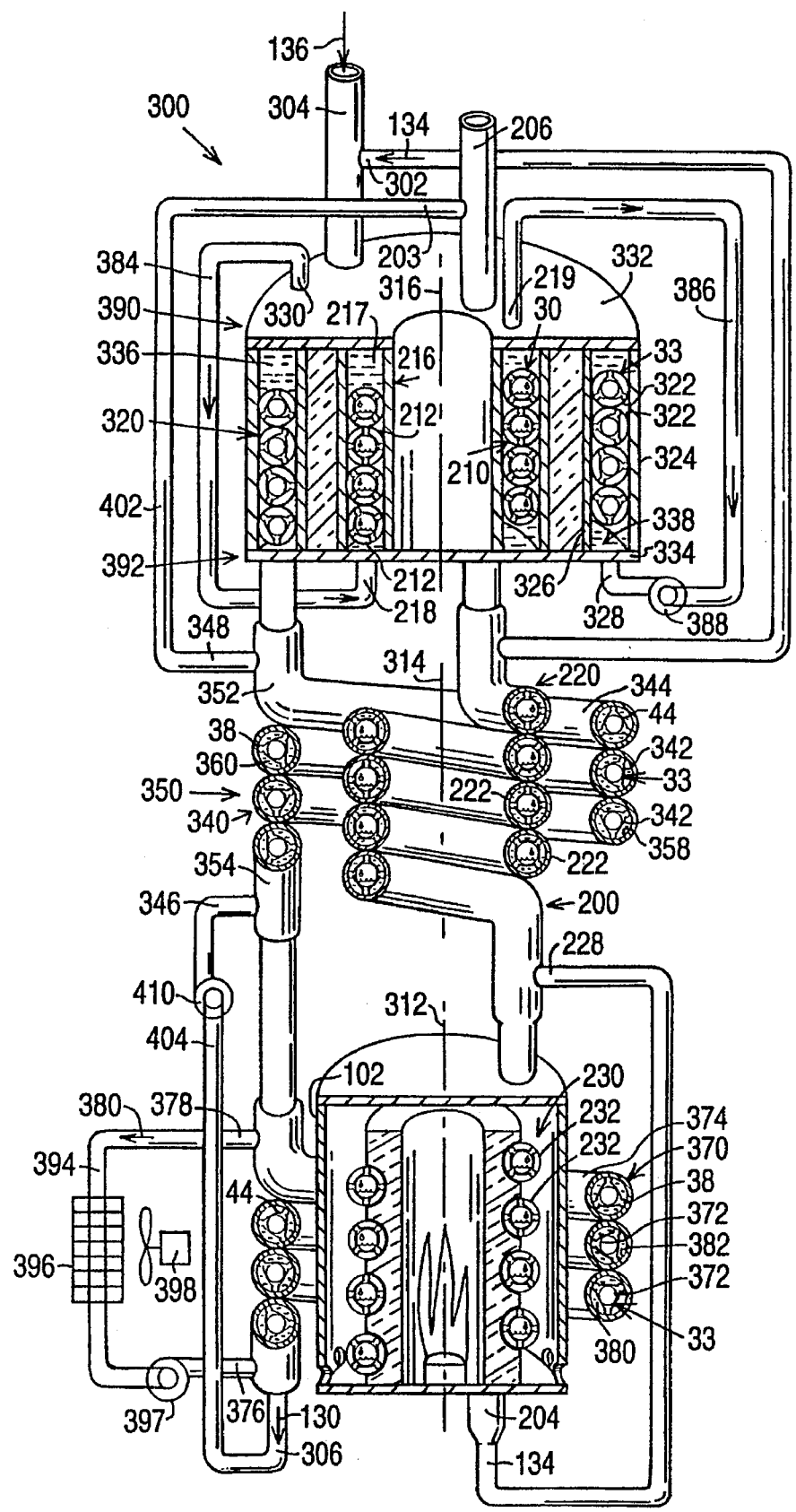
FIG. 20 is a cross-sectional perspective of an absorber and desorber combination according to the present invention with the absorber and desorber each having three windings of coils with each of the windings enclosed in a cylinder or an annular cylinder or the tube forming the winding enclosed in a second tube.

Often, such as in heat transfer machines, a desorber is used in conjunction with an absorber. Such an absorber and desorber combination is illustrated in FIG. 20 and is generally designated as 300 with the absorber portion designated generally as 350 and the desorber portion generally as 200. Details of desorber 200 have been described previously with regard to FIGS. 18 and 19 it being noted that lower desorber winding 230 is contained in a cylinder 102 as described for FIG. 19. Various other configurations for desorber windings, desorber tube and winding enclosures, and heat transfer fluid flows have been previously described and may be used without departing from the scope of the present invention.

As shown in FIG. 20, absorber 350 is formed about the desorber 200. The positioning of absorber 350 with respect to desorber 200 and especially the position of various coil windings of absorber 350 and desorber 200 are illustrative and is not intended to be limiting. Absorber 350 is formed from a thin-wall twisted fluted tube that may be of either capillary or non-capillary configuration but with capillary twisted fluted tubing being preferred. Absorber tube 33 has an upper weak solution inlet 302 for receiving weak solution 134, an upper inlet 304 for receiving desorbed gas (vapor) 136, and a lower outlet 306 for the discharge of strong solution 130. At least a portion of absorber tube 33 is cooled with a heat transfer fluid such as 1) ambient air, 2) hydronic fluids such as a) a water solution of ethylene glycol, b) brine solution, or c) aqueous potassium carbonate, or 3) a strong solution from absorber tube 33. Typically at least a portion of absorber tube 33 is formed as a helical winding of absorber coils. In FIG. 20, absorber 350 has been formed from capillary twisted fluted tube 33 as an upper absorber winding 320 of coils 322 with upper coil centerline axis 316, an intermediate helical absorber winding 340 of coils 342 with intermediate coil centerline axis 314, and a lower helical absorber winding 370 of coils 372 with lower coil centerline axis 312. Although various absorber and desorber coils and enclosing containers have been shown with common centerline axes, such orientation is not intended to be limiting but has been used only for illustrative purposes. A wide variety of other absorber and desorber device coil orientations are possible without departing from the overall scope of the invention. Thus, for example, if the operating temperature ranges of the various absorber and desorber coils become too dissimilar, it may be advantageous to separate each coil winding rather than form them as concentric windings about a common axis.

Typically a winding of absorber coils may be a least partially enclosed in a cylinder, an annular cylinder, or a second tube. Thus upper winding 320 is enclosed in an annular cylinder 338 comprising outer cylinder 324 and inner cylinder 326. The absorber tube 33 of intermediate and lower windings 340 and 370 is enclosed in second tubes 344 and 374, respectively.

Often it is preferable to enclose an absorber winding in an annular cylinder so as to achieve "confined counter-current cross flow" or in a second enclosing tube to achieve "confined helical counter-current flow." To achieve "confined counter-current cross flow" for upper helical winding 320, at least a portion of the helical winding 320 of absorber coils 322 is enclosed in an annular cylinder 338 comprising an inner cylindrical wall 326, an outer cylindrical wall 324, an inlet 328, an outlet 330, an upper annular cylinder portion 390 and a lower annular cylinder portion 392 with the outlet 330 located in the upper annular cylinder portion 390 and the inlet 328 located in the lower annular cylinder portion 392. Since weak solution 134 flows downward from inlet 302 to outlet 306, positioning of annular cylinder inlet 328 in the lower portion 392 of annular cylinder 338 and outlet 330 in the upper portion 390 of the annular cylinder 338 results in a "counter current flow" for heat transfer fluid 217 flowing in the annular cylinder 338 with respect to weak solution flow in absorber tube 33. The flows are in a general directional sense, i.e., solution within twisted fluted tube 33 flows generally downward while heat transfer solution flowing in the annular cylinder 338 flows generally upward.

Coils 322 of winding 320 are maintained in contact with each other and with inner cylindrical wall 326 and outer wall 324 to afford "confined cross flow" of heat transfer fluid 217 within the annular cylinder 338, that is, the heat transfer fluid flows generally across the coils (perpendicular to the tube longitudinal axis (axis 48 in FIG. 8)). Confined cross flow generally occurs in the same fashion for both capillary twisted fluted tubes (FIGS. 4–6) and twisted fluted tubes (FIGS. 1–3). The general discussion of confined cross flow with respect to capillary twisted fluted tubes as detailed and explained for FIGS. 13–15 is also applicable to the present discussion.

To achieve confined helical counter current flow in intermediate absorber winding 340, at least a portion of capillary twisted fluted tube 33 used to form winding 340 of absorber coils 342 is enclosed in a second, generally concentric outer tube 344 having an inlet 346, an outlet 348, an upper end portion 352, and a lower end portion 354. The outwardly extending helical crest 38 of tube 33 is in contact with the inner surface 358 of outer tube 344 throughout the rotation of crest 38 about the longitudinal axis of capillary twisted fluted tube 33. Contact of crest 38 with inner surface 358 confines heat transfer fluid flow to the helical space formed by exterior helical flute 44 and second tube inner surface 358. Inlet 346 is located in the lower portion 354 of second tube 344 while outlet 348 is located in the upper portion of tube 344 so as to afford a flow of heat transfer fluid 360 in a direction that is counter current to the flow of weak solution 134 in tube 33.

As with intermediate absorber winding 350, at least a portion of capillary twisted fluted tube 33 used to form lower absorber winding 370 is also enclosed in a second tube 374 with an inlet 376 and an outlet 378 configured with crest 38 in contact with inner surface 382 to achieve confined helical counter-current flow of heat transfer fluid 380.

As seen in FIG. 20, heat transfer fluid 217 cools, i.e., acquires heat from upper absorber winding 320, after which it leaves the annular cylinder 338 enclosing upper absorber winding 320 through outlet 330 and passes to desorber annular cylinder inlet 218 via conduit 384 where it heats upper desorber winding 210 by passing through the annular cylinder 210 and over desorber winding 210 in confined counter-current cross flow. Heat transfer fluid 217 (designated as 336 in annular cylinder 338) then exits through desorber outlet 219 and returns to absorber inlet 328 via conduit 386. Pump 388 provides the motive force to circulate the heat transfer fluid 217 through the absorber and desorber annular cylinders 338 and 216 and over and across upper absorber and upper desorber windings 320 and 210, respectively. Typically a closed-loop hydronic fluid such as an aqueous solution of potassium carbonate ($K_2CO_3$) is used as the heat transfer fluid (217 and 336). However, in some situations cold strong solution 130 from absorber tube 33 may be used to cool the upper absorber winding 320 with the acquired heat subsequently used to heat desorber winding 210.

As shown in FIG. 20, capillary twisted fluted tube 33 forming lower and intermediate absorber windings 370 and 340 is enclosed in second tubes 374 and 344, respectively, and configured to give "confined helical counter-current flow" of the heat transfer fluid. That is, heat transfer fluid 380 (lower absorber winding 370) and heat transfer fluid 360 (intermediate absorber winding 340) flow in a confined helical path in exterior flute 44 about tube 33 as a result of contact of exterior crest 38 with interior second tube walls 358 (intermediate winding 340) and 380 (lower winding 370) throughout the rotation of crest 38 about the longitudinal tube axis. Because inlets 376 and 346 are in the lower portion of the second tubes 374 and 344 and the outlets 378 and 348 are in the upper portions of the second tubes, heat transfer fluids 380 and 360 flow counter-current to the downward flow of weak solution 134 from upper inlet 302 to lower outlet 306. As a result of these two characterizations of heat transfer flow in the tube-in-tube configuration, the flow is referred to here as "confined helical counter-current flow."

Lower absorber coil winding 370 is cooled with a heat transfer fluid 380 such as a hydronic fluid of water and ethylene glycol passing through inlet 376 and around capillary twisted fluted tube 33 in the helical space formed by exterior flute 44, crest 38, and interior surface 382 of second tube 374. Having acquired heat from the absorption process taking place within tube 33 of winding 370, the heat transfer fluid leaves the second tube 374 through outlet 378 and flows through heat exchanger 396 where heat is removed. Fan 398 further assists in the heat removal process. Cooled heat transfer fluid 380 is pumped back to inlet 376 by pump 397 to again repeat the process. For many applications such as in heat transfer machines, the heat transfer fluid 380 may also be routed and used to cool various other components of the machine including rectifiers and condensers.

Intermediate absorber coil winding 340 can also be cooled with a heat transfer fluid 360 in confined helical counter-current flow as described for the lower coil winding 370. However and as shown in FIG. 20, it is advantageous to take cold strong solution 130 that has been cooled by heat transfer fluid 380 in lower absorber winding 370 and use it as heat transfer fluid 360 to cool the intermediate absorber winding 340. As seen in FIG. 20, cold strong solution 130 from absorber outlet 306 is routed to the inlet 346 of second tube 344 surrounding capillary twisted fluted tube 33 that forms intermediate winding 340 via conduit 404. The strong solution (heat transfer fluid 360) cools the absorption process taking place in tube 33 of intermediate coil winding 340 in a "confined helical counter-current flow" regime and leaves second tube 344 through outlet 348 and flows via conduit 402 to desorber strong solution inlet 203. Heating of the strong solution by intermediate absorber winding 340 further facilitates the desorption process in desorber 200.

As has been described, a wide variety of tube-in-tube, tube-in-cylinder, and tube-in-annular cylinder configurations are possible using twisted fluted tubes and capillary twisted fluted tubes. Preferably the fluted tubes are formed as windings of coils but this is not a limiting feature when a tube-in-tube configuration is used. For tube-in-tube configurations, contact, partial contact, or lack of contact of the exterior tube crest with the interior surface of the second enclosing tube is a distinguishing feature giving rise to a wide variety of tube-in-tube configurations. For tube-in-cylinder configurations, 1) contact or lack thereof between exterior tube crests of adjacent (juxtaposed) coils, 2) contact or lack thereof between coil tube crests and the inner cylinder wall, and 3) contact or lack thereof between coil tube crests and the outer cylinder wall provide a wide variety of possible configurations. In addition, the fluid flow direction within the fluted tube and the fluid flow direction in the enclosing tube, cylinder or annular cylinder, (over the exterior surface of the fluted tube) gives rise to additional configuration combinations. Exterior fluted tube heat transfer fluid flow generally in the same direction as liquid flow within the fluted tube is here termed "co-current flow." Exterior fluted tube heat transfer fluid flow generally in an opposite direction to the liquid flow within the fluted tube is here termed "counter-current flow." For tube-in-tube configurations, contact of the outer tube crest with the interior wall of the enclosing tube results in a flow confined to the helical exterior groove of the fluted tube about the tube longitudinal axis and is here termed "confined helical flow" which, as noted above, may be either of co-current or counter-current character.

Similarly when a fluted tube winding of fluted tube coils is enclosed in an annular cylinder (tube-in-annular cylinder) with contact of exterior tube crests of adjacent coils and contact of exterior tube crests with both the inner and outer annular cylinder walls, the heat transfer fluid is confined to a flow generally across the fluted tube (transverse to the longitudinal tube axis and parallel to the coil axis) which is here termed "confined cross flow." As with tube-in-tube devices, the general flow of heat transfer fluid with respect to the flow of a fluid within the fluted tube may be either of co-current or counter-current character.

FIG. 21 illustrates another embodiment, designated generally as 500, of a combination of tube-in-tube and tube-in-annular cylinder devices used to form a three winding absorber 350 and three winding desorber 200 combination wherein at least one of the windings of the desorber 200 or the absorber 350 is formed from a capillary twisted fluted tube. Desorber 200 consists of an upper strong solution inlet 203 for receiving strong solution 130, an upper desorber gas outlet 206 serving as an outlet for desorbed gas from the strong solution, a lower desorber outlet 204 serving as an outlet for weak solution 134, an upper helical winding 210 of desorber coils 212 formed from capillary fluted tube 30 about an upper desorber coil centerline axis 316, an intermediate helical winding 220 of desorber coils 222 formed from capillary fluted tube 30 about an intermediate desorber coil centerline axis 314 and a lower helical winding 230 of desorber coils 232 formed from capillary fluted tube 30 about a lower desorber coil centerline axis 312. The desorber coil winding 210 is enclosed in an annular cylinder 216 so as to afford confined counter-current cross flow of heat transfer fluid 217 within the annular cylinder 216.

Capillary twisted fluted tube 30 forming intermediate winding 220 is enclosed in a second enclosing tube 227 with inlet 228 and outlet 229. The enclosing tube 227, inlet 228 and outlet 229 are configured so as to afford confined helical counter-current flow of heat transfer fluid 226. Lower helical desorber winding 230 of coils 232 is enclosed in annular cylinder 236 with inlet 238 and outlet 240. Inlet 238, outlet 240, annular cylinder 236 and helical desorber winding 230 are configured so as to yield confined counter-current cross flow of the heat transfer fluid 152 over and about coils 232 of winding 230.

The absorber 350 consists of a thin-wall capillary twisted fluted tube 33 with an upper inlet 302 for receiving weak solution 134, upper inlet 304 for receiving gas 136 to be absorbed, and a lower outlet 306 for discharging strong solution 130. Although the gas being absorbed and the weak solution are shown in co-current flow, it is to be realized that counter-current flow can also be used by providing the gas inlet to the absorber at the opposite end of the absorber tube 33.

An upper winding 320 of absorber coils 322 is contained in an upper absorber annular cylinder 338 with a lower heat transfer fluid inlet 328 and an upper heat transfer fluid outlet 330. The annular cylinder 338, inlet 328, outlet 330, and coil winding 320 are configured so as to afford confined counter-current cross flow of heat transfer fluid 336.

Tube 33 of intermediate absorber winding 340 is contained in an outer tube 344 with a heat transfer fluid inlet 346 and a heat transfer fluid outlet 348. The inlet 346, outlet 348, outer tube 344 and winding 340 are configured in such a fashion so as to achieve confined helical counter-current flow of heat transfer fluid 360.

Tube 33 of lower helical winding 370 of coils 372 is contained in an enclosing tube 374 with inlet 376 and outlet 378. The inlet 376, outlet 378, enclosing tube 374, and helical winding 370 are configured so as to afford confined helical counter-current flow of heat transfer fluid 380 over and around coils 372 using pump 397. It is to be realized that other configurations and flow regimes may be used for the heat transfer fluid without departing from the present invention.

In FIG. 21, combustion products are used as the heat transfer fluid 152 to heat the lower winding 230 of desorber coils 232 by passing into annular cylinder 236 through inlet 238, over and around annular winding 230 in confined counter-current cross flow and out through outlet 240 so as to heat the desorption process occurring within tube 30. It is to be noted that if the temperature of the combustion products leaving outlet 240 is sufficiently high, it can be used for further heating of intermediate desorber winding 220.

Hot, weak solution 134 leaving desorber outlet 204 is routed to the enclosing tube 344 of intermediate desorber coil 220 via conduit 406. The hot, weak solution 134 serves as heat transfer fluid 226 for heating the desorption process occurring within desorber tube 30 in a confined helical counter-current flow regime. On leaving tube 227 enclosing tube 30 of the intermediate winding 220, the weak solution 134 passes via conduit 408 to inlet 302 of absorber unit 350.

The upper desorber winding 210 is heated by heat transfer fluid 217 that flows through annular cylinder 216 in a confined counter-current cross flow regime via inlet 218 and outlet 219. The cooled heat transfer fluid 217 passes from the upper desorber outlet 219 through conduit 386 into absorber inlet 328 where it passes through annular cylinder 338 in confined counter-current cross flow acquiring heat from the absorption process occurring within tube 33 of absorber 350. Heat transfer fluid, denoted as 336 in absorber annular cylinder 338, leaves outlet 330 of annular cylinder 338 and returns to the inlet 218 of annular cylinder 216 where it is used to heat the desorption process. As is apparent, this is a closed loop system with heat transfer fluid being pumped through the upper annular cylinders 216 and 338 via a motive force such as pump 388. In this instance, heat transfer fluids 217 and 338 are identical.

As shown in FIG. 21, the lower absorber winding 370 is cooled by a heat transfer fluid 380 such as a hydronic fluid of ethylene glycol and water passing through the second tube 374 enclosing a portion of tube 33 via inlet 376 in confined helical counter-current flow and out through outlet 378. The hydronic fluid is conveyed via conduit 394 through heat exchanger, e.g., radiator, 396 where it is cooled after which it again returns to enclosing tube 374 via inlet 376 to repeat the cycle. Fan 398 provides additional circulation of cooling air over heat exchanger 396. A motive force, such as a pump 397 or thermosiphon (not shown), is provided to circulate the hydronic fluid through the loop and to other components of the system if advantageous to do so.

The intermediate absorber winding 340 is cooled with the cooled strong solution 130 leaving absorber exit 306 which is passed via conduit 404 to enclosing tube 344 through inlet 346 after which it circulates in confined helical counter-current flow around tube 33 acquiring heat from the absorption process taking place within tube 33 of intermediate winding 340. The warmed weak solution 130 leaves the outer enclosing tube 344 of the enclosed intermediate winding 340 via outlet 348 from which it is conveyed to desorber inlet 203 via conduit 402.

The heat transfer fluid used in the upper annular cylinders 216 and 338 enclosing upper desorber winding 210 and upper absorber winding 320, respectively, is a hydronic fluid such as potassium carbonate. However, and as shown in FIGS. 22 and 23, it is possible to use a portion of strong solution 130 from absorber tube 33 as the heat transfer fluid. In FIG. 22, a tee connection 412 is used to convey a portion of strong solution 130 from absorber tube outlet 306 to upper absorber annular cylinder inlet 328 via conduit 414. A control valve 416 is used to regulate flow of strong solution to the upper annular absorber cylinder 338. Strong solution leaves upper annular absorber cylinder 338 via outlet 330 and is conveyed to upper annular desorber inlet 218 via conduit 384. Strong solution leaves the upper annular desorber cylinder through outlet 219 and proceeds to enter desorber tube 30 via inlet 418.

In FIG. 23, a tee 420 is used to convey a portion of strong solution 130 from outlet 348 of outer tube 344 of intermediate absorber winding 340 to upper absorber annular cylinder inlet 328 via conduit 422. Other than removing a portion of strong solution flow after use in cooling of intermediate absorber winding 340 rather than before, the configuration shown in FIG. 23 is essentially identical to that in FIG. 22. As shown in FIGS. 21–23, a motive force such as pump 410 is used to convey strong solution 130 from the absorber outlet 306 to the inlet 346 of the outer tube 344 of absorber winding 340. Pump 410 also conveys the strong solution 130 to upper absorber annular cylinder inlet 328 when a portion of the strong solution is used to cool upper absorber winding 320 and then heat upper desorber winding 210.

When the absorbent of the solution pair is of a volatile nature, e.g., water, it is often desirable to remove absorbent vapor from the desorbed gaseous refrigerant 136 flowing from upper desorber outlet 206. To remove the volatile absorbent component, a rectifier 502 is used. As shown, rectifier 502 is of tube-in-annular cylinder construction and is typically cooled with a hydronic heat transfer fluid that enters through inlet 506 and exits through outlet 508. In some instances, the hydronic fluid may be the same as that used to cool the lower absorber winding 370. Tube 514 may be a plain thin-wall tube or a thin-walled twisted fluted tube formed into a winding (not shown) and contained within annular cylinder 504. The coils of the rectifier winding (not shown) may or may not contact each other and may or may not contact the interior wall 510 and the exterior wall 512 of annular cylinder 504. The rectification process can be important in some instances depending on the further processing of vapor 136 such as when vapor 136 is subjected further to condensation and evaporation. When absorbent vapor is not removed from the gaseous refrigerant, a substantial reduction in condensation and evaporation efficiencies may result.

Figure 24:
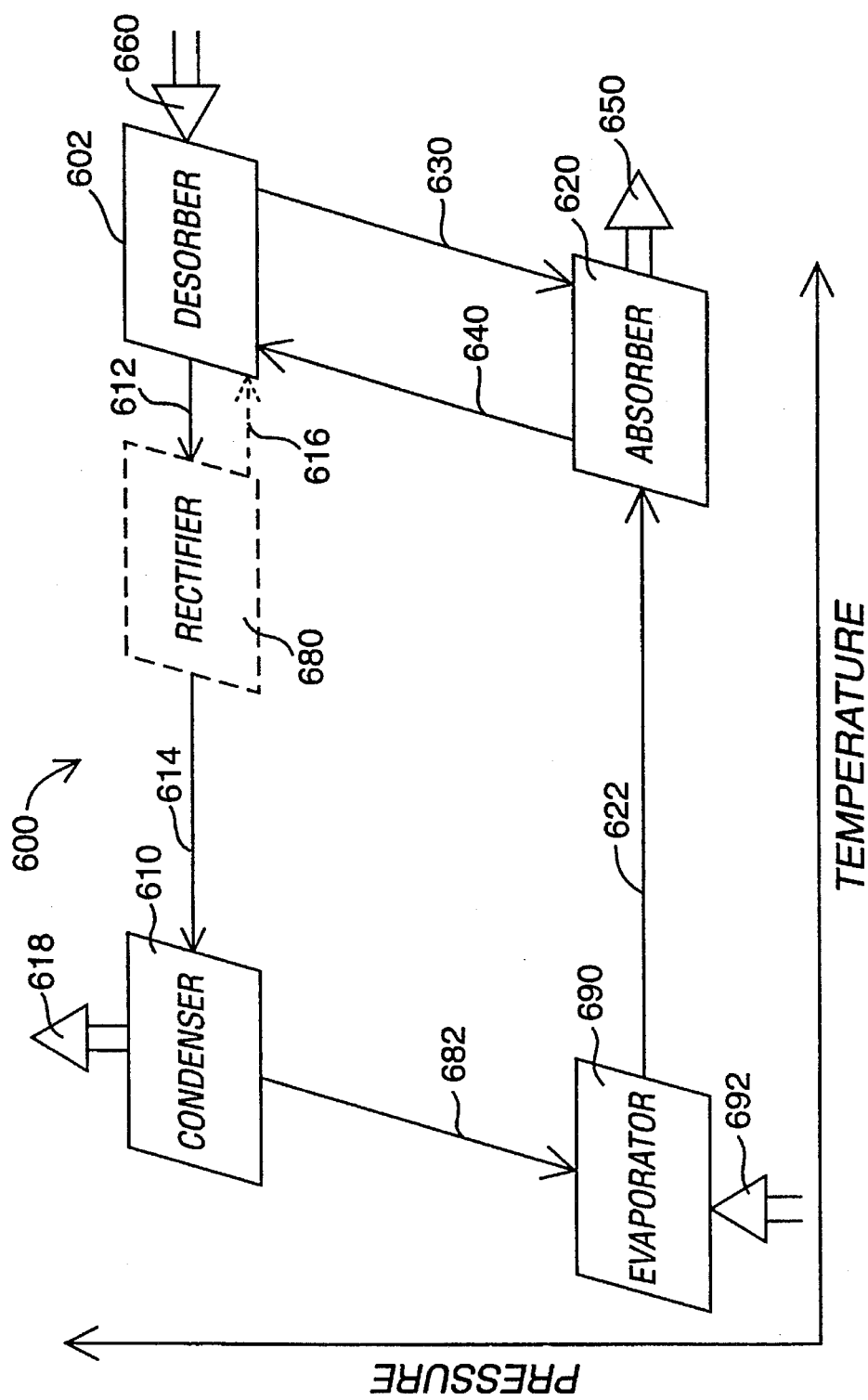
FIG. 24 is a schematic representation of an absorption machine having an interconnected absorber, desorber, condenser, evaporator and rectifier.

The desorber and absorber configurations of the present invention are of special significance when used in heat and mass transfer systems referred to as absorption machines. FIG. 24 shows a schematic thermodynamic representation of a conventional single circuit absorption machine designated generally as 600. FIG. 24 is set forth on a coordinate system showing increasing temperature from left to right and increasing pressure from bottom to top. Hot weak absorbent solution in desorber 602 at a pressure equal to that in condenser 610 flows to absorber 620 via conduit 630. Typically, the solution in conduit 630 is throttled to the lower absorber pressure (not shown). The weak solution absorbs low pressure refrigerant vapor in absorber 620 with the release of heat as denoted by the large out pointing arrow 650. The resulting strong solution is returned to desorber 602 by means of a pump (not shown) via conduit 640. The strong solution in desorber 602 is heated as shown by the large in-pointing arrow 660. Heating of desorber 602 distills refrigerant (vapor or gas) from the strong solution leaving a weak solution which is returned to absorber 620 via conduit 630 to repeat the cycle.

The hot, high pressure gaseous refrigerant from desorber 602 passes to condenser 610 via conduits 612 and 614. If the absorbent is a volatile material, the absorbent vapor must be removed from the refrigerant vapor by means of one or more fractional distillation (rectification) steps which are carried out in rectifier 680 where the less volatile absorbent vapor is condensed and returned to desorber 602 via conduit 616.

Rectification is generally not required when the absorbent is a non-volatile salt such as lithium bromide. In such instances, rectifier 680 is unnecessary and the gaseous refrigerant passes directly to condenser 610. The hot refrigerant vapor condenses to a hot liquid in condenser 610 with the liberation of heat as denoted from the upward pointing arrow 618 from condenser 610. The hot liquid refrigerant is then sent to low-pressure evaporator 690 via conduit 692. Typically the high pressure liquid refrigerant is throttled to the low-pressure evaporator 690 where it expands and evaporates using heat from the space to be cooled (load) as indicated by the large upward pointing arrow 692 to evaporator 690. The cold, low pressure refrigerant vapor is sent to absorber 620 via conduit 622 where it is absorbed by the weak solution in absorber 620.

Figure 25:
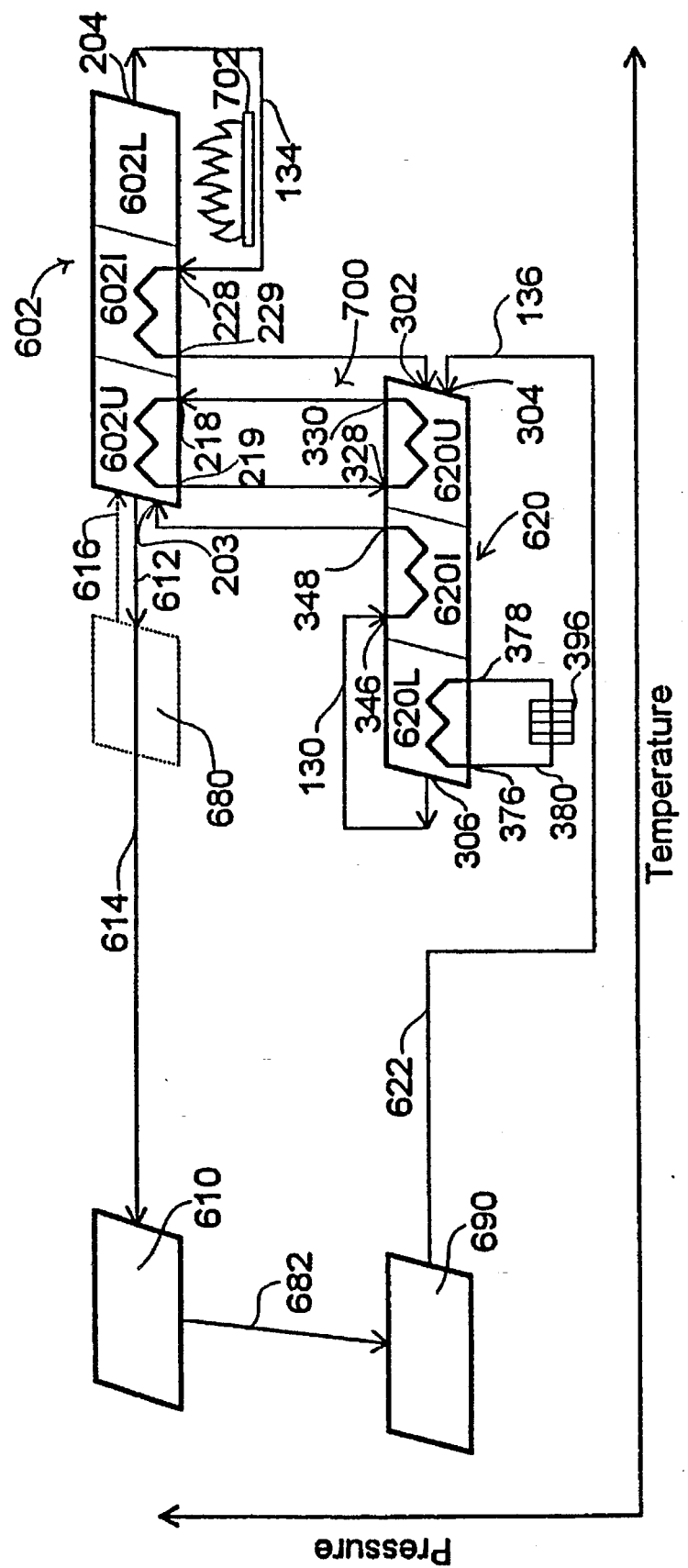
FIG. 25 is a schematic representation of a generator-absorber heat exchange machine with a hydronic fluid heat transfer loop between the absorber and desorber (generator) which have an overlapping temperature region for at least a portion of their operating temperature ranges.

FIG. 25 illustrates schematically a generator (desorber)-absorber heat-exchange machine. In FIG. 25, pressure is shown as increasing from bottom to top and temperature as increasing from left to right. In this machine (cycle), absorber heat is used to warm strong solution 130 and the sensible heat of the weak solution 134 is used to heat the generator (desorber) 602. By overlapping the temperature ranges of the absorber 620 and desorber 602, it is possible to obtain increased cycle efficiencies by using a closed heat transfer loop 700 to transfer additional absorber heat from the absorber 620 to the desorber 602.

As shown in FIG. 25, absorber 620, desorber 602, condenser 610, and evaporator 690 are interconnected as previously described for the absorption machine 600 of FIG. 24. Rectifier 680 is used to remove absorbent vapor from the desorbed refrigerant stream when a volatile absorbent is used. Absorber 620 and desorber 602 have been divided into upper, intermediate and lower sections designated as 602U, 602I, 602L and 620U, 620I and 620L, respectively. These designations (upper, intermediate, and lower) refer to the elevational level of each section of the absorber or desorber unit with respect to gravitational flow.

As shown, hot weak solution leaves desorber 602 through outlet 204 in the lower desorber section 602L after final heating by a heat source such as burner 702. Hot weak solution 134 then is used to exchange additional heat to intermediate desorber section 602I via inlet 228 and outlet 229 after which it is sent to absorber inlet 302 in upper absorber section 620U. Weak solution 134 picks up (absorbs) gas (refrigerant) 136 from evaporator 690 in absorber 620 with the liberation of heat. A portion of this heat is removed from lower absorber section 620L where the absorber is cooled with hydronic fluid 380 that enters through inlet 376 and leaves through outlet 378. The hydronic fluid 380 is cooled using heat exchanger (radiator) 396. The cold strong solution 130 leaving the absorber through outlet 306 is used to cool intermediate absorber section 620I where it passes through inlet 346 and out through outlet 348 after which the heated strong solution 130 is sent to desorber inlet 203 in upper desorber section 602U. Heat transfer loop 700 is used to gain additional efficiencies by transferring heat liberated from the absorption process in upper absorber section 620U to upper desorber section 602U where it is used to heat the desorption process. A hydronic fluid such as aqueous potassium carbonate passes in through inlet 218 and out through outlet 219 of desorber section 602U after which it passes to inlet 328 and outlet 330 of upper absorber section 620U before returning to upper section desorber inlet 218 to repeat the process.

Figure 26:
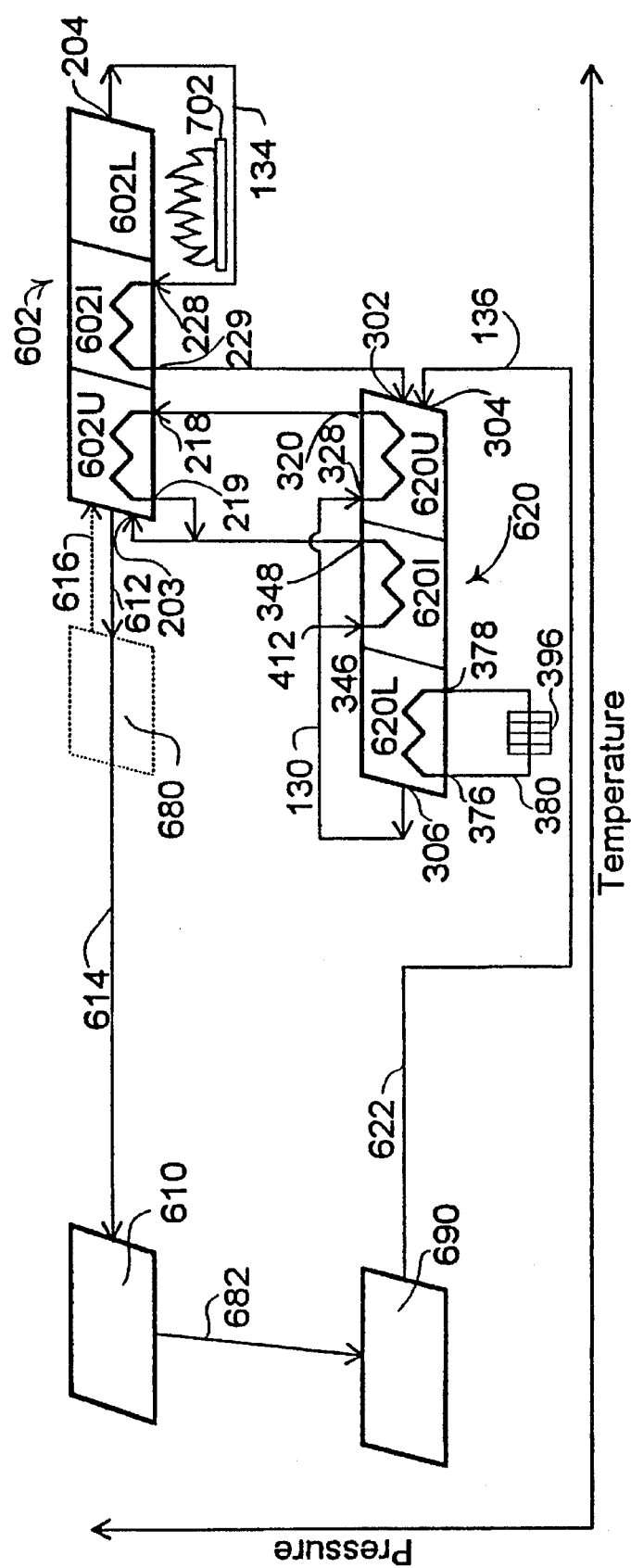
FIG. 26 is a schematic representation of another embodiment of the generator-absorber heat exchange machine of FIG. 25 in which a portion of the strong solution from the absorber outlet is used as a heat transfer fluid to cool the upper absorber section and then to heat the upper desorber section after which it enters the desorber inlet.
Figure 27:
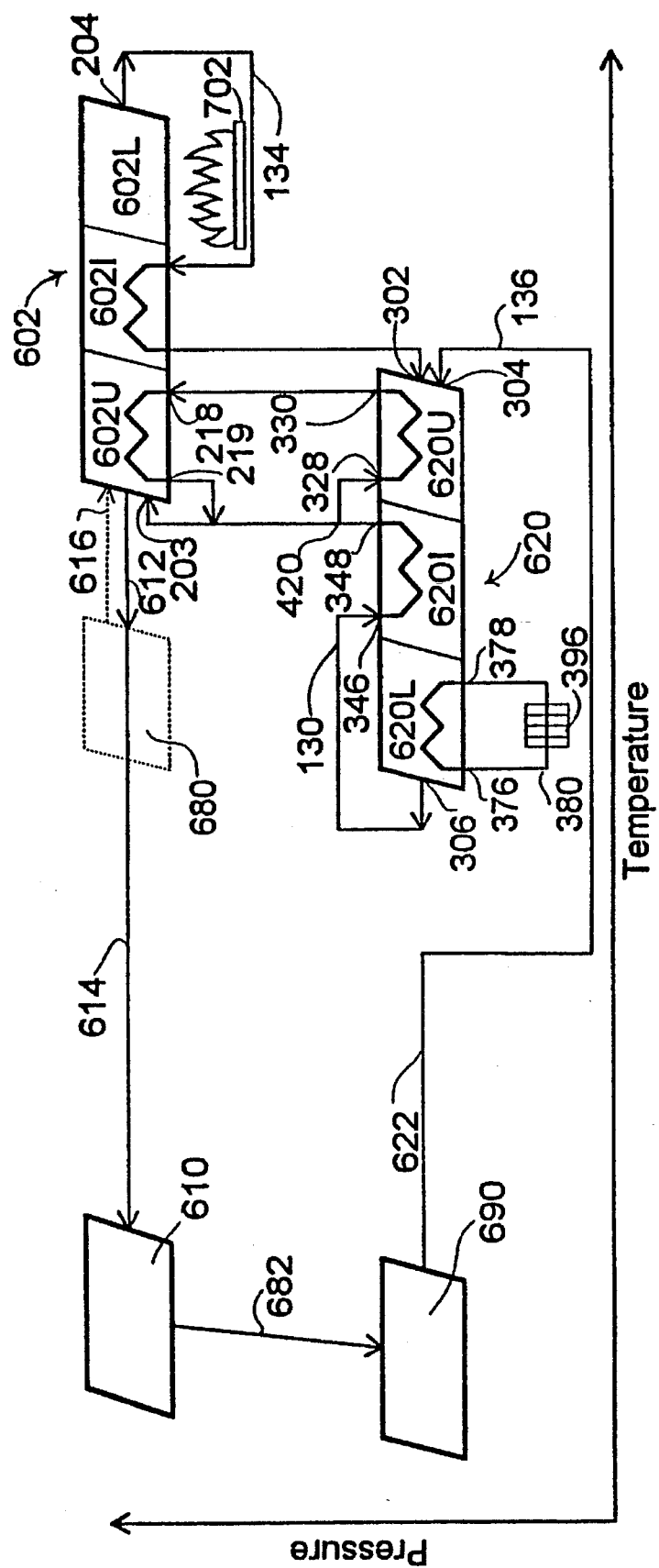
FIG. 27 is a schematic representation of another embodiment of the generator-absorber heat exchange machine of FIG. 25 in which a portion of the strong solution from the outlet of the second absorber section is used as a heat transfer fluid to cool the upper absorber section and then to heat the upper desorber section after which it enters the desorber inlet.

It has been found particularly advantageous to use the capillary twisted fluted tube 30 as shown in and described for FIGS. 4 and 5 in conjunction with heat transfer machines such as the general configuration shown in FIG. 24 and further embodied in the generator absorber heat exchange machines shown in FIGS. 25–27. For compactness, capillary twisted fluted tube 30 is formed as a winding of a plurality of coils about a coil centerline axis with the coils juxtaposed one to the next in a generally annular composite form as shown and described for FIG. 12.

Heat transfer efficiencies are further provided by enclosing the capillary twisted fluted tube in a second tube (FIGS. 8–10) and forming the resulting tube-in-tube device 70 as a winding of helical coils (FIG. 11). Alternatively, a winding of a capillary fluted tube 90 (FIG. 12) may be enclosed in a cylinder 102 (FIGS. 6 and 17) or an annular cylinder 101 (FIGS. 13–15).

Additional heat transfer efficiencies are achieved by bringing the enclosing second tube 60 of a tube-in-tube configuration 70 (FIGS. 8–10) in contact with the exterior helical crest 38 of the twisted fluted tube 30 throughout the rotation of the helical crest 38 about longitudinal tube axis 48 resulting in a confined helical flow of heat transfer fluid in the helical flute 44 of capillary fluted tube 30. With a tube-in annular cylinder configuration, such efficiencies are achieved by bringing the coils (exterior crests 38) in contact with each other and the coils (exterior crests 38) in contact with both the interior cylindrical surface 106 and exterior cylindrical surface 108 of the enclosing annular cylinder 101 so as to achieve a confined cross flow of heat transfer fluid over and around the winding of coils 92 (FIGS. 13–15).

When the overall flow direction in the second enclosing tube, e.g., tube 60, or the enclosing annular cylinder, e.g., annular cylinder 101, is opposite the overall flow direction within tube 30, the heat transfer fluid flow is referred to here as counter-current flow while flow in the same direction is referred to here as co-current flow. Typically for heat transfer machines, confined heat transfer fluid flow is either confined helical counter-current flow (tube-in-tube configurations) or confined counter-current cross flow (tube-in-annular cylinder configurations).

In FIG. 25, tube-in-tube, tube-in-cylinder, or tube-in-annular cylinder can be effectively used for the condenser 610, evaporated 690, absorber 620, desorber 602, and rectifier 680 components. The thin-wall twisted fluted tube may be of capillary twisted flute design (FIGS. 4–7) or of open twisted flute design (FIGS. 1–3) for the various applications. For evaporator 690 and desorber 602 configurations, a capillary twisted fluted tube 30 with confined counter-current flow of the heat transfer fluid is preferred, i.e., confined helical counter-current heat transfer fluid flow for a tube-in-tube device or a confined counter-current heat transfer fluid cross flow for a tube-in-annular cylinder device.

The three sections of absorber 620, i.e., 620L, 620I and 620U, are preferably either tube-in-tube or tube-in-annular cylinder devices configured to achieve confined counter-current flow of the heat transfer fluid. For lower section 620L, a hydronic fluid 380 such as ethylene glycol and water is used to cool the absorber tube and associated strong solution 130 flowing in it. The cooled strong solution 130 emerging from desorber outlet 306 enters intermediate absorber section 620I via inlet 346 and is used as a heat transfer fluid to cool intermediate absorber section 620I. Warmed strong solution leaves intermediate section 620I through outlet 348 from which it is passed to desorber inlet 203. Suitable tube-in-tube configurations with confined helical counter-current flow for use as lower and intermediate absorber sections 620L and 620I are further illustrated and detailed with respect to absorber 350 (FIG. 21), especially with respect to windings 340 and 370 which correspond to intermediate and lower absorber sections 620I and 620L, respectively. A suitable tube-in-annular cylinder configuration with confined counter-current cross flow is shown with respect to absorber winding 320 in FIG. 21 and corresponds to upper absorber section 620U.

The three sections of desorber 602, i.e., 602L, 602I, and 602U, are preferably either capillary twisted fluted tube-in-tube or capillary twisted fluted tube-in-annular cylinder devices configured to achieve confined counter-current flow of the heat transfer fluid. For upper section 602U, a hydronic fluid such as an aqueous solution of potassium carbonate is used to heat the strong solution within the capillary twisted fluted tube of the desorber. Typically the heat transfer fluid enters the upper section through inlet 218 and leaves through outlet 219. A suitable capillary twisted fluted tube-in-annular cylinder 216 is shown with respect to capillary twisted fluted tube winding 210 in FIG. 18.

Because upper absorber section 620U and upper desorber section 602U have overlapping temperature ranges (FIG. 25), it is advantageous to form a closed loop 700 in which a heat transfer fluid is used to transfer heat from the absorption process in the upper absorber section 620U to the upper desorber section 602U. A suitable device for carrying out this heat transfer is the concentric annular cylinder absorber and desorber design shown in FIG. 21 with respect to absorber winding 320 and desorber winding 210. As seen, hydronic fluid enters upper absorber inlet 328 and, after being warmed by the absorption process taking place in the absorber tube, leaves via outlet 330 where it is conveyed to desorber inlet 218 where it heats the desorption process taking place in the desorber tube and then leaves via outlet 219 to be conveyed to absorber inlet 328 to repeat the process. Because of the overlapping temperature ranges of the upper desorber and absorber sections, it is desirable to remove insulating material between the two concentric annular cylinders 216 and 328 shown in FIG. 21 so as to minimize heat loss and improve heat exchange between upper absorber and desorber sections 620U and 602U.

Intermediate desorber section 602I is heated with hot weak solution 134 leaving desorber tube outlet 204. The hot solution enters inlet 228 of intermediate desorber section 602I where it heats the desorption process. A suitable device for carrying out both the desorption and heat transfer process is a capillary twisted fluted tube-in-tube device configured to give confined helical counter-current heat transfer fluid flow or a capillary twisted fluted tube-in-annular cylinder configured to afford confined counter-current heat transfer fluid cross flow. A suitable capillary twisted fluted tube-in-tube device for such purposes is shown in FIG. 18 with respect to tube-in-tube winding 220.

The lower desorber section 602L can be configured with any of the capillary twisted fluted tube devices. A capillary twisted fluted tube-in-tube configuration with confined helical heat transfer fluid flow is especially effective for use with superheated stream or hot water. A capillary twisted fluted tube-in-annular cylinder configured to achieve confined cross flow such as shown with respect to coil winding 230 in FIG. 18 can be used with stream or hot combustion products. A capillary twisted fluted tube wound in a groove on an insulating cylinder and contained in a second cylinder as shown in FIGS. 16, 17 and 19 is especially effective in achieving good desorption as a result of the good liquid-vapor equilibrium achieved as the strong solution boils and spatters from the slit in the capillary flute. Such effective action is brought about as the strong solution rises in the capillary flute on the cooler side of the capillary fluted tube next to the insulating cylinder due to capillary action and then boils and spatters from the slit in the capillary fluted tube at the top of the capillary twisted fluted tube as a result of gravity and the boiling action produced by the hot combustion products.

The design and operating parameters for an ammonia-water desorber according to the present invention for use in a ten refrigeration ton heat transfer machine such as shown schematically in FIG. 25 (desorber 602) and configured as shown in FIG. 18 is summarized in Table I. The desorber has two different heat transfer modes in the fluted tube. One mode is thin film evaporation and evaporation and boiling in the interior crest region of the tube and the other is pool boiling in the trough (flute/capillary channel) region.

For the upper desorber section 602U (FIG. 25; winding 210 and annular cylinder 216 in FIG. 18) and the intermediate desorber section 602I (FIG. 25; winding 220 with second enclosing tube 227) only forced convection heat transfers occurs on the annular or second tube side. For the lower desorber section 602L (FIG. 25, winding 230 and annular cylinder 236), however, both forced convention heat transfer and radiation heat transfer occur because of the high temperature of the combustion products (flue gas) 152 (365°–3400° F.). The ammonia-water solution pair (strong solution) flows generally downward through the desorber as a result of gravitation flow occupying only a small portion of the total volume of the fluted tube (see FIGS. 4, 6, 8 and 9); desorber ammonia vapor (gas/refrigerant) is removed from the top of the desorber tube (counter-current flow with respect to the strong solution). The circle 37 (FIG. 6) produced by the rotation of the outer (exterior) crest apex is considered here as the outer fluted tube diameter ($D_{eo}$); similarly the circle 45 produced by the rotation of the inner (interior) crest apex is considered here as the inner fluted tube diameter ($D_{bi}$).

TABLE I

Ten Refrigeration Ton Desorber Configuration
Ammonia-Water Solution Pair

|  | Upper Desorber | Intermediate Desorber | Lower Desorber |
|---|---|---|---|
| A. Heat Transfer |  |  |  |
| 1. Heat Transfer Fluid (HTF) | aqueous potassium carbonate | strong solution (ammonia-water) | combustion products (flue gas) from natural gas combustion |
| 2. General HTF Flow Direction with respect to Solution Pair | counter-current | counter-current | counter-current |
| 3. HTF Flow Type | confined cross flow | confined helical flow | confined cross flow |
| B. Fluted Tube Characteristics |  |  |  |
| 1. Outside Diameter at outer helical crest apex ($D_{eo}$) | 1.6 inches (4.06 cm) | 1.6 inches; (4.06 cm) | 1.6 inches; (4.06 cm) |
| 2. Inside Diameter at inner helical crest apex ($D_{bi}$) | 0.95 inches: (2.41 cm) | 0.95 inches; 2.42 (cm) | 0.95 inches; (2.41 cm) |
| 3. Coil Diameter | 12 inches: (30.5 cm) | 12 inches: (30.5 cm) | 12 inches: (30.5 cm) |
| 4. Number of flutes per foot | 25 | 25 | 25 |
| 5. Number of flute starts | 4 | 4 | 4 |
| 6. Tube wall thickness | 0.028 inches; (0.711 mm) | 0.028 inches; (0.711 mm) | 0.028 inches: (0.711 mm) |
| 7. Tube length | 55.6 feet; (16.9 m) | 21.6 feet; (6.58 m) | 16.1 feet; (4.91 m) |
| 8. Tube weight | 39.83 lbs; (18.07 kg) | 28.82 lbs; (13.07 kg) | 11.53 lbs; (5.23 kg) |
| C. Pressure Drop |  |  |  |
| 1. Within Tube | 0.145 psi; (999.74 Pa) | 0.198 psi; (1365.16 Pa) | 0.170 psi; (1172.11 Pa) |
| 2. HTF | 0.850 psi; (5860.54 Pa) | 0.702 psi; (4840.12 Pa) | 0.010 psi (68.9475 Pa) |
| D. Mass Flow |  |  |  |
| 1. Within Tube | 551.2 lb/hr; 250.0 Kg/hr | 474.7 lb/hr; 215.3 Kg/hr | 420.4 lb/hr; (190.69 Kg/hr) |
| 2. HTF | 2400 lb/hr; (1088 Kg/hr) | 293.1 lb/hr; (132.9 Kg/hr) | 126.48 lb/hr; (57.370 Kg/hr) |

The capillary twisted fluted tubes of the present invention can also be used to effect direct heat transfer between various processes. Referring generally to FIG. 13, the desorption process can take place in capillary twisted fluted tube 30 with strong solution 130 entering the upper portion 138 of tube 30, a gaseous refrigerant 136 leaving through the upper portion 138 of tube 30, and weak solution 134 leaving through lower portion 140 of tube 30. The absorption process takes place in enclosing container (annular cylinder) 101. Thus weak solution and gaseous refrigerant are admitted to enclosing container 101 through upper section 118 in co-current flow with strong solution leaving the enclosing container 101 through lower tube portion 116.

Figure 28:
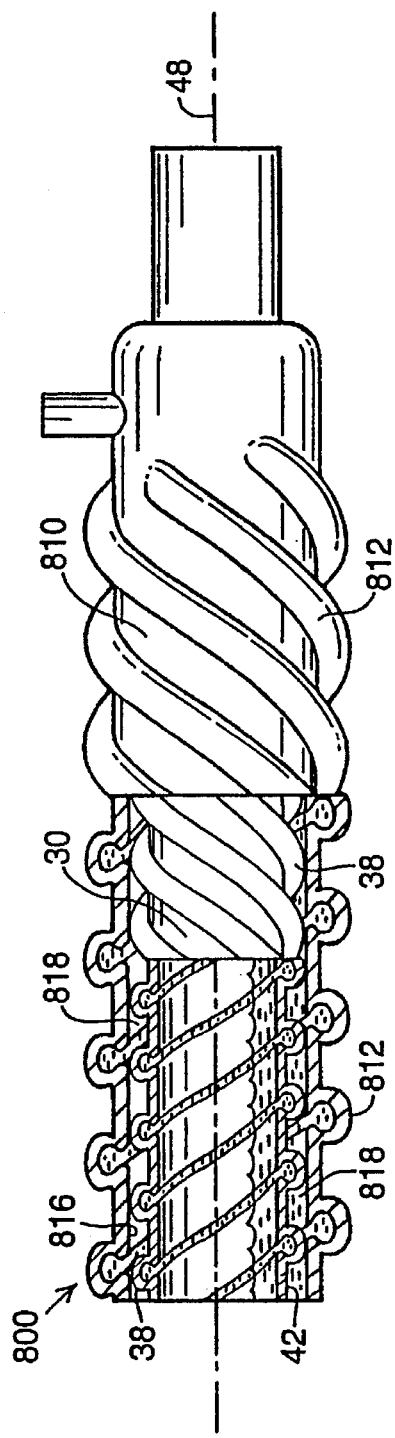
FIG. 28 is a view partly in elevation and partly in cross section showing a capillary twisted fluted tube enclosed in a second capillary twisted fluted tube with the direction of helical rotation of the exterior helical crest (and complementary interior helical flute) of the inner tube being the same as the direction of helical rotation of the exterior helical crest of the enclosing second capillary twisted fluted tube.
Figure 29:
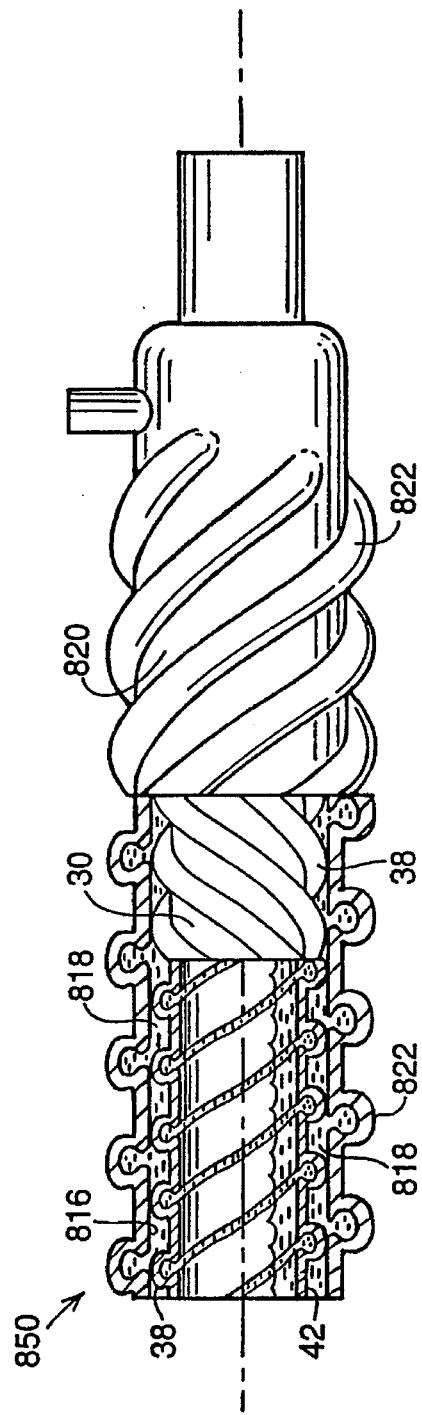
FIG. 29 is a view partly in elevation and partly in cross section showing a capillary twisted fluted tube enclosed in a second capillary twisted fluted tube with the direction of helical rotation of the exterior helical crest (and complementary interior helical flute) of the inner tube being opposite the direction of helical rotation of the exterior helical crest of the enclosing second capillary twisted fluted tube.

The enclosing container can also be another tube such as enclosing tube 60 shown in FIGS. 8–10. As shown in FIGS. 28–29, the enclosing tube can be a second capillary twisted fluted tube with the capillary flute rotating in a direction that is the same or opposite that of the inner capillary twisted fluted tube. As seen in FIG. 28, capillary twisted fluted tube 30 is enclosed in a second capillary twisted fluted tube 810 denoted generally as 800. Crests 38 of inner capillary twisted fluted tube 30 and crests 812 of the second capillary twisted fluted tube 810 having a helical rotation in the same direction. In FIG. 29, capillary twisted fluted tube 30 is enclosed in a second capillary twisted fluted tube 820 denoted generally as 850. Crests 822 of the second capillary twisted fluted tube 820 and crests 38 of the inner capillary twisted fluted tube 30 have helical rotations that are in opposite directions.

Configurations 800 and 850 are particularly suited for carrying out direct heat transfer between two processes, one typically being an endothermic process and the other an exothermic process. Thus an endothermic (heat requiring) process such as desorption or evaporation can be carried out within inner capillary twisted fluted tube 30 while an exothermic (heat generating) process such as absorption, condensation, or rectification can be carried out in the space 818 between the exterior surface 42 of tube 30 and the interior surface 816 of the second enclosing twisted fluted tube 810 or 820. Alternatively, the exothermic process can be carried out in the inner tube 30 while the endothermic process is carried out in space 818. As noted previous in the discussion for FIGS. 8–11, the second outer tube can also be a smooth tube. The second outer tube can also be an open twisted fluted tube. In any of these configurations, the first and second tubes may be in contact with each other or they may be spaced apart as discussed for FIG. 10. For space-saving considerations, the various combinations of inner and outer tubes and spacing between these tubes are typically formed into a helical coil as shown in FIG. 11.

Figure 31:
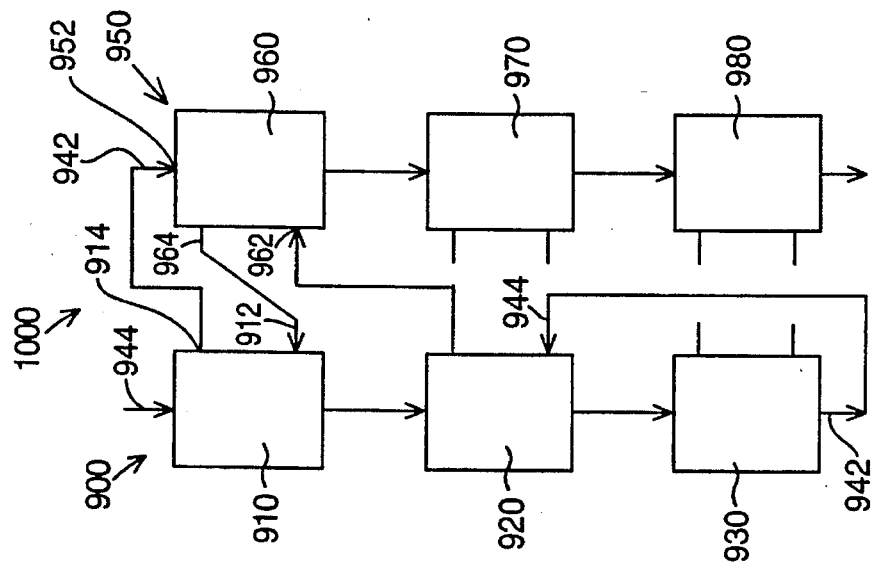
FIG. 31 is a schematic view of a desorber/absorber combination in which weak solution is used as a heat transfer fluid in the absorption process.
Figure 30:
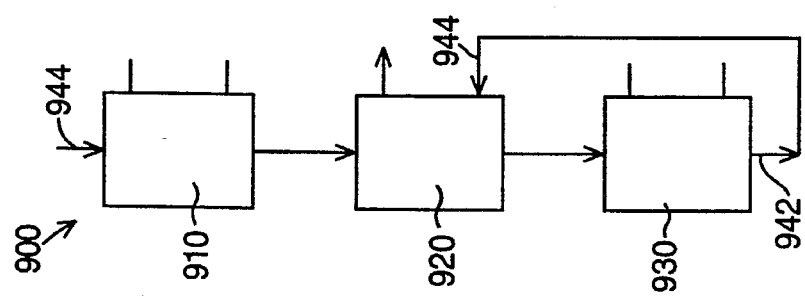
FIG. 30 is a schematic view of a three section desorber illustrating the use of weak solution as a heat transfer fluid in the desorption process.

FIGS. 30 and 31 illustrate the use of weak solution as a heat transfer fluid for both the desorption and absorption process. FIG. 30 is a schematic representation of a desorber generally designated as 900 with three sections of capillary twisted fluted tube winding, an upper desorber section 910, an intermediate desorber section 920, and a lower desorber section 930. As discussed previously any one or all of these sections may be enclosed in a container including a cylinder, an annular cylinder or a second tube including a second capillary twisted fluted tube as noted above. The container can be spaced apart or in contact with the capillary twisted fluted tube. When an annular cylinder is used as the container (a tube-in-annular cylinder configuration), confined cross flow over the exterior surface of the inner capillary twisted fluted tube can be achieved by placing the coils of the winding in contact with each other and with the inner and outer interior walls of the annular cylinder. When a second tube is used as the container (a tube-in-tube configuration), confined helical flow over the exterior surface of the capillary twisted fluted tube can be achieved by placing the exterior helical crest of the capillary fluted tube in contact with the interior wall of the enclosing second tube. With both confined cross flow and confined helical flow, the flow can be counter-current or co-current with the liquid flow taking place within the capillary twisted fluted tube. Any one of these configurations can be used for the upper desorber section 910, the intermediate desorber section 920, and the lower desorber section 930 of desorber 900. A strong solution 944 passing through the desorber 900 with application of appropriate amounts of heat in each of the sections 910, 920, and 930 emerges from the interior of the capillary twisted fluted tube of desorber 900 as weak solution 942 as a result of the desorption of absorbed gas during the desorption process. The heat acquired by the weak solution during the desorption process can be effectively reused in the desorber by returning the weak solution to inlet 944 of the enclosing container of the intermediate desorber section 920 for heat transfer to the desorption process.

FIG. 31 illustrates the use of the weak solution in an absorber desorber combination generally designated as 1000. The device 1000 consists of desorber 900 as has been previous described and an absorber generally denoted by the numeral 950. Absorber 950 consists of three sections of capillary twisted fluted tube winding, an upper absorber section 960, an intermediate absorber section 970, and a lower absorber section 980. Each of these sections can be configured in a fashion previously discussed for the desorber sections 910, 920 and 930 as further illustrated, but not limited by, the discussion of the three section absorber shown in FIGS. 20–23.

As shown in FIG. 31, hot weak solution 942 is returned to desorber section 920 through inlet 944 where the acquired heat is used further in the desorption process. On leaving intermediate desorber section 920, weak solution 942 is relatively cool and is passed to upper absorber section 960 through inlet 962 where it acquires heat from the absorption process occurring within the capillary twisted fluted tube of absorber 950. Heated weak solution 942 then leaves upper absorber section 960 through outlet 964 and passes to inlet 912 of upper desorber section 910 where the heat acquired from the absorption process occurring in absorber 950 is used to heat the desorption process occurring in desorber 900. The cool weak solution 942 leaves the upper desorber section through outlet 914 and is passed to the interior of absorber capillary twisted fluted tube through inlet 952.

It is possible that changes in configurations to other than those shown could be used but that which is shown if preferred and typical. Without departing from the spirit of this invention, various means of enclosing the capillary fluted tube and passing heat transfer fluids through the enclosure may be used as well as a multitude of ways of connecting the resulting devices for use in a wide variety of machines including heat transfer machines such as the generator absorber heat exchange machines.

It is to be understood that although the present invention has been specifically disclosed with the preferred embodiment and examples, modifications to the experimental design may be apparent to those skilled in the art and such modifications and variations are considered to be within the scope of the invention and the appended claims. It is also intended that all matter contained in the above description shall be interpreted as illustrative and not in a limiting sense, the scope of the invention being indicated by the appended claims rather than by the foregoing description, and all changes that come within the meaning and range of equivalency of the claims are therefore intended to be embraced therein. That is, the following claims are intended to cover all of the generic and specific features of the invention herein described, and all statements of the scope of the invention which, as a matter of language, fall therebetween. Furthermore, it is to be understood that in the following claims, ingredients or compounds recited in the singular are intended to include compatible mixtures of such ingredients wherever the sense permits.

We claim:

1. A capillary twisted fluted tube comprising a thin-wall tube having a longitudinal tube axis defining an interior tube-wall space and having at least one interior helical capillary tube flute formed at least in part to define a helical capillary channel extending for at least a portion of a length of an interior surface of said thin-wall tube; said interior helical capillary tube flute being formed from a portion of said thin-wall tube, said portion having a center section and opposing side sections, said opposing side sections of said portion of said thin-wall tube being in close proximity to each other and defining a narrow helical capillary channel slit and said center section of said portion of said thin-wall tube formed as a trough and defining said helical capillary channel; said narrow helical capillary channel slit forming a passage from said helical capillary channel to said interior thin-wall tube space; said interior helical capillary tube flute being complementary with an outwardly extending, exterior, helical crest on said exterior surface of said thin-wall tube, each rotation of said exterior helical crest about said longitudinal tube axis defining an exterior helical crest turn with adjacent exterior helical crest turns and an exterior surface portion of said thin-wall tube between said adjacent exterior helical crest turns defining an exterior helical flute with said exterior helical flute being complementary with an interior helical crest on said interior surface of said thin-wall tube.

2. A mass and heat transfer device comprising a capillary twisted fluted tube according to claim 1.

3. A desorber comprising a capillary twisted fluted tube according to claim 1.

4. A condenser comprising a capillary twisted fluted tube according to claim 1.

5. An absorber comprising a capillary twisted fluted tube according to claim 1.

6. An evaporator comprising a capillary twisted fluted tube according to claim 1.

7. A rectifier comprising a capillary twisted fluted tube according to claim 1.

8. The capillary twisted fluted tube of claim 1 having a plurality of interior helical capillary tube flutes.

9. A tubularly enclosed capillary twisted fluted tube comprising a capillary twisted fluted tube according to claim 1 with said capillary twisted fluted tube at least partially enclosed in a second tube and wherein a longitudinal tube center-line axis of said second tube and said longitudinal tube centerline axis of said capillary twisted fluted tube are essentially parallel.

10. A capillary twisted fluted tube in-tube helical winding comprising a tubularly enclosed capillary twisted fluted tube according to claim 9 formed as a plurality of coils about a coil centerline axis with said coils juxtaposed one to the next in a generally annular composite form.

11. The tubularly enclosed capillary twisted fluted tube according to claim 9 wherein said outwardly extending, exterior, helical crest is in contact with an interior surface of said second tube throughout its helical rotation about said longitudinal tube centerline axis and wherein said longitudinal tube centerline axis of said second tube and said longitudinal tube centerline axis of said capillary twisted fluted tube are coextensive.

12. A capillary twisted fluted tube helical winding comprising a tubularly enclosed capillary twisted fluted tube according to claim 11 formed as a plurality of coils about a coil centerline axis with said coils juxtaposed one to the next in a generally annular composite form.

13. A capillary twisted fluted tube helical winding comprising a capillary twisted fluted tube according to claim 1 formed as a plurality of coils about a coil centerline axis with the coils juxtaposed one to the next in a generally annular composite form.

14. A cylindrically enclosed capillary twisted fluted tube winding comprising a capillary twisted fluted tube winding according to claim 13 wherein at least a portion of said plurality of coils are enclosed in a cylinder, said cylinder having a cylinder center-line axis that is essentially parallel with said coil centerline axis.

15. An annularly enclosed capillary twisted fluted tube winding comprising a capillary twisted fluted tube winding according to claim 13 wherein said plurality of coils are enclosed in an annular cylinder having an inner cylinder wall and an outer cylinder wall and having an annular cylinder centerline axis that is essentially coextensive with said coil center-line axis.

16. The annularly enclosed capillary twisted fluted tube winding of claim 15 with adjacent coils of said capillary twisted fluted tube winding being in contact with each other.

17. The annularly enclosed capillary twisted fluted tube winding of claim 15 with said coils of said capillary twisted fluted tube winding being in contact with said inner cylinder wall and said outer cylinder wall.

18. The annularly enclosed capillary twisted fluted tube winding of claim 17 with adjacent coils of said capillary twisted fluted tube winding being in contact with each other.

19. A mass and heat transfer device comprising a capillary twisted fluted tube winding according to claim 13 with said capillary twisted fluted tube winding being formed about a cylinder, said cylinder having a cylinder centerline axis that is essentially parallel and coextensive with said coil centerline axis.

20. The mass and heat transfer device according to claim 19 with said cylinder having a helical groove formed therein, said helical groove receiving at least a portion of said capillary twisted fluted tube forming said cylindrically enclosed capillary twisted fluted tube winding.

21. A desorber comprising:
a) said capillary twisted fluted tube helical winding according to claim 13, with said coil center-line axis of said helical winding having an essentially vertical orientation and said helical winding further comprising
  1) an upper strong solution inlet for receiving a strong solution;
  2) a desorbed gas outlet serving as an outlet for desorbed gas from said strong solution;
  3) a lower outlet serving as a drain for weak solution,
b) a heating means for heating at least a portion of said capillary twisted fluted tube winding.

22. The desorber according to claim 21 with said desorber further comprising a packing material in said interior tube-wall space.

23. The desorber according to claim 21 wherein said upper strong solution inlet and said desorbed gas outlet are the same.

24. The desorber according to claim 21 wherein said heating means is a heat transfer fluid.

25. The desorber according to claim 21 wherein said heating means is an exothermic process with direct heat exchange to said desorber.

26. The desorber according to claim 25 wherein said exothermic process is an absorption process.

27. The desorber according to claim 25 wherein said exothermic process is a condensation process.

28. The desorber according to claim 25 wherein said exothermic process is a rectification process.

29. The desorber according to claim 21 wherein said capillary twisted fluted tube helical winding is at least partially contained in a containing cylinder, said containing cylinder having a cylinder centerline axis that is essentially parallel with said coil centerline axis.

30. The desorber according to claim 29 wherein said heating means is combustion products and said containing cylinder has a combustion product outlet.

31. The desorber according to claim 29 wherein said heating means is an exothermic process with direct heat exchange to said desorber.

32. The desorber according to claim 29 with said capillary twisted fluted tube winding being formed about an insulating cylinder, said insulating cylinder having an insulating cylinder centerline axis that is essentially parallel and coextensive with said coil centerline axis.

33. The desorber according to claim 32 with said insulating cylinder having a helical groove formed therein, said helical groove receiving at least a portion of said capillary twisted fluted tube forming said cylindrically enclosed capillary twisted fluted tube winding.

34. The desorber according to claim 33 wherein a) said insulating cylinder is an annular insulating cylinder comprising:
 1) a top,
 2) a bottom,
 3) an outer cylindrical surface,
 4) an inner cylindrical surface, said inner cylindrical surface defining an open cylindrical center space with
  a) an upper portion and
  b) a lower portion, said lower portion of said open cylindrical center space of said annular insulating cylinder containing a burner;

b) said centerline axis of said containing cylinder and said centerline axis of said annular insulating cylinder being coextensive;

c) said containing cylinder comprising an upper circular enclosing end, an interior cylinder surface and a lower enclosing end;

d) said interior cylinder surface of said containing cylinder, said outer cylindrical surface of said insulating annular cylinder, said upper circular enclosing end of said containing cylinder, and said lower annular enclosing end of said containing cylinder defining an annular outer space;

e) said outer cylinder upper circular enclosing end and said top of said annular insulating cylinder defining an upper insulating cylinder space;

f) said annular outer space, said upper insulating cylinder space, and said open center space of said annular insulating cylinder forming an interconnected combustion product passage;

g) said containing cylinder comprising a combustion product outlet near said bottom of said containing cylinder; and h) said heating means for heating at least a portion of said capillary twisted fluted tube winding comprising combustion products from said burner, said combustion products passing
 1) upward in said open center space of said annular portion from said burner, then
 2) over said top of said annular cylinder in a radially outward direction in said upper space between said top of said annular insulating cylinder and said containing cylinder upper circular enclosing end, then
 3) downward in said outer annular space heating a radially outward extending portion of said capillary twisted fluted tube of said tube winding, and then
 4) radially outward through said outlet near said bottom of said containing cylinder.

35. The desorber according to claim 29 wherein said containing cylinder is an annular cylinder, said annular cylinder having an inner cylinder wall, an outer cylinder wall, an inlet and an outlet.

36. The desorber according to claim 35 wherein said heating means for heating at least a portion of said capillary twisted fluted tube winding is a heat transfer fluid flowing into said inlet, heating said capillary twisted fluted tube winding contained in said annular cylinder, and flowing out of said annular cylinder through said outlet.

37. The desorber according to claim 36 wherein said heat transfer fluid is combustion products.

38. The desorber according to claim 36 wherein said heat transfer fluid is said weak solution.

39. The desorber according to claim 36 wherein said heat transfer fluid is said strong solution.

40. The desorber according to claim 36 wherein said heat transfer fluid is a hydronic fluid.

41. The desorber according to claim 35 wherein said heating means for heating at least a portion of said capillary twisted fluted tube winding is an exothermic process carried out in said annular cylinder with direct heat transfer to said capillary twisted fluted tube.

42. The desorber according to claim 41 wherein said exothermic process is an absorption process.

43. The desorber according to claim 35 with adjacent coils of said capillary twisted fluted tube winding being in contact with each other.

44. The desorber according to claim 35 with said coils of said capillary twisted fluted tube winding being in contact with said inner cylinder wall and said outer cylinder wall.

45. The desorber according to claim 44 with adjacent coils of said capillary twisted fluted tube winding being in contact with each other.

46. The desorber according to claim 45 wherein said heating means for heating at least a portion of said capillary twisted fluted tube winding is a heat transfer fluid flowing into said inlet, flowing over and around and heating said capillary twisted fluted tube winding contained in said annular cylinder in confined cross flow, and flowing out of said annular cylinder through said outlet.

47. The desorber according to claim 46 wherein said heating means for heating at least a portion of said capillary twisted fluted tube winding is combustion products.

48. The desorber according to claim 46 wherein said heating means for heating at least a portion of said capillary twisted fluted tube winding is said weak solution.

49. The desorber according to claim 46 wherein said heating means for heating at least a portion of said capillary twisted fluted tube winding is said strong solution.

50. The desorber according to claim 46 wherein said heat transfer fluid is a hydronic fluid.

51. The desorber according to claim 45 wherein said heating means for heating at least a portion of said capillary twisted fluted tube winding is an exothermic process with direct heat exchange to said desorber.

52. The desorber according to claim 51 wherein said exothermic process is an absorption process.

53. The desorber according to claim 46 wherein said outlet of said annular cylinder is located in an upper portion of said annular cylinder and said inlet of said annular cylinder is located in a lower portion of said annular cylinder.

54. The desorber according to claim 53 wherein said heat transfer fluid is combustion products.

55. The desorber according to claim 53 wherein said heat transfer fluid is said weak solution.

56. The desorber according to claim 53 wherein said heat transfer fluid is said strong solution.

57. The desorber according to claim 53 wherein said heat transfer fluid is a hydronic fluid.

58. The desorber according to claim 21 wherein at least a portion of said capillary twisted fluted tube of said capillary twisted fluted tube helical winding is enclosed in a second tube, said second tube having a first end and a second opposite end, said second tube having a longitudinal centerline axis that is parallel to a longitudinal centerline axis of said capillary twisted fluted tube and said second tube having a first opening at said first end and a second opening at said second opposite end.

59. The desorber according to claim 58 wherein said heating means for heating said capillary twisted fluted tube winding enclosed in said second tube is a heat transfer fluid flowing into said first opening in said second tube, flowing over and around and heating said capillary twisted fluted tube contained in said second tube, and then flowing out of said second tube through said second opening.

60. The desorber according to claim 59 wherein said heat transfer fluid for heating said capillary twisted fluted tube is combustion products.

61. The desorber according to claim 59 wherein said heat transfer fluid for heating said capillary twisted fluted tube winding is said weak solution.

62. The desorber according to claim 59 wherein said heat transfer fluid for heating said capillary twisted fluted tube winding is said strong solution.

63. The desorber according to claim 59 wherein said heat transfer fluid is a hydronic fluid.

64. The desorber according to claim 58 wherein said heating means for heating at least a portion of said capillary twisted fluted tube winding enclosed in said second tube is an exothermic process carried out within said second tube with direct heat exchange to said desorber.

65. The desorber according to claim 64 wherein said exothermic process is an absorption process.

66. The desorber according to claim 65 wherein said second tube is a capillary twisted fluted tube.

67. The desorber according to claim 66 wherein said helical capillary channel of said desorber rotates in a direction opposite that of a helical capillary channel of said second tube.

68. The desorber according to claim 66 wherein said helical capillary channel of said desorber rotates in the same direction as that of a helical capillary channel of said second tube.

69. The desorber according to claim 58 wherein said outwardly extending, exterior, helical crest of said capillary twisted fluted tube is in contact with an interior surface of said second tube throughout its helical rotation about said longitudinal centerline axis of said capillary twisted fluted tube.

70. The desorber according to claim 69 wherein said heating means for heating said portion of said capillary twisted fluted tube winding contained in said enclosing second concentric tube is a heat transfer fluid flowing into said second tube first opening, flowing over and around and heating said capillary twisted fluted tube contained in said second tube and flowing out of said second tube through said second tube second opening.

71. The desorber according to claim 70 wherein said heat transfer fluid is combustion products.

72. The desorber according to claim 70 wherein said heat transfer fluid is said weak solution.

73. The desorber according to claim 70 wherein said heat transfer fluid is said strong solution.

74. The desorber according to claim 70 wherein said heat transfer fluid is a hydronic fluid.

75. The desorber according to claim 69 wherein said heating means for heating said portion of said capillary twisted fluted tube winding contained in said enclosing second concentric tube is an exothermic process carried out in said second concentric tube with direct heat transfer to said desorber.

76. The desorber according to claim 69 wherein said exothermic process is an absorption process.

77. The desorber according to claim 69 wherein said exothermic process is a condensation process.

78. The desorber according to claim 69 wherein said exothermic process is a rectification process.

79. The desorber according to claim 70 wherein said second opening of said second tube is located in an upper portion of said second tube and said first opening of said second tube is located in a lower portion of said second tube.

80. The desorber according to claim 79 wherein said heat transfer fluid is combustion products.

81. The desorber according to claim 79 wherein said heat transfer fluid is said weak solution.

82. The desorber according to claim 79 wherein said heat transfer fluid is said strong solution.

83. The desorber according to claim 79 wherein said heat transfer fluid is a hydronic fluid.

84. A desorber comprising:
 a) a capillary twisted fluted tube according to claim 1, said capillary twisted fluted tube further comprising:
  1) an upper strong solution inlet for receiving a strong solution;
  2) a desorbed gas outlet serving as an outlet for desorbed gas from said strong solution;
  3) a lower desorber outlet serving as an outlet for a weak solution;
  4) an upper helical winding of desorber coils formed from said capillary fluted tube about an upper desorber coil center-line axis;
  5) an intermediate helical winding of desorber coils formed from said capillary fluted tube about an intermediate desorber coil center-line axis;
  6) a lower helical winding of desorber coils formed from said capillary fluted tube about a lower desorber coil center-line axis; and
 b) a heating means for heating at least a portion of said capillary twisted fluted tube.

85. The desorber according to claim 84 wherein said heating means is an exothermic process with direct heat transfer to said desorber.

86. The desorber according to claim 85 wherein said exothermic process is an absorption process.

87. The desorber according to claim 85 wherein said exothermic process is a condensation process.

88. The desorber according to claim 84 wherein said upper strong solution inlet is identical with said desorbed gas outlet.

89. The desorber according to claim 84 wherein said heating means is a heat transfer fluid used at least in part for heating said upper winding of desorber coils.

90. The desorber according to claim 89 wherein said heat transfer fluid is said hydronic fluid.

91. The desorber according to claim 89 wherein said heat transfer fluid is a strong solution.

92. The desorber according to claim 84 wherein at least a portion of said capillary twisted fluted tube forming said upper winding of desorber coils is enclosed in a second, generally concentric outer tube, said second generally concentric outer tube having an inlet, an outlet, an upper end portion and a lower end portion.

93. The desorber according to claim 92 wherein said outwardly extending exterior helical crest on said outside wall of said thin-wall capillary twisted fluted tube is in contact with an interior surface of said second outer tube.

94. The desorber according to claim 93 wherein said inlet is in said lower end portion of second outer tube and said outlet is in said upper end portion of said second outer tube.

95. The desorber according to claim 84 wherein at least a portion of said upper winding of desorber coils is enclosed in an annular cylinder comprising an inner cylindrical wall, an outer cylindrical wall, an inlet, and an outlet, said annular cylinder having an upper annular cylinder portion and a lower annular cylinder portion.

96. The desorber according to 95 wherein coils of said upper winding of coils are in contact with each other and with said inner cylindrical wall and said outer cylindrical wall of said annular cylinder.

97. The desorber according to claim 96 wherein said inlet is in said lower annular cylinder portion and said outlet is in said upper annular cylinder portion of said annular cylinder.

98. The desorber according to claim 97 wherein said heating means is a heat transfer fluid passing into said annular cylinder through said inlet, over and around said upper winding of desorber coils enclosed in said annular cylinder, and out of said annular cylinder through said outlet.

99. The desorber according to claim 98 wherein said heat transfer fluid is a hydronic fluid.

100. The desorber according to claim 99 wherein said hydronic fluid is a solution of potassium carbonate and water.

101. The desorber according to claim 98 wherein said heat transfer fluid is said strong solution.

102. The desorber according to claim 84 wherein said heating means is a heat transfer fluid used at least in part for heating said intermediate winding of desorber coils.

103. The desorber according to claim 102 wherein said heat transfer fluid is said weak solution.

104. The desorber according to claim 84 wherein at least a portion of said intermediate winding of desorber coils is enclosed in an annular cylinder comprising an inner cylindrical wall, an outer cylindrical wall, an inlet, and an outlet, said annular cylinder having an upper annular cylinder portion and a lower annular cylinder portion.

105. The desorber according to claim 104 wherein coils of said intermediate winding of coils are in contact with each other and with said inner cylindrical wall and said outer cylindrical wall of said annular cylinder.

106. The desorber according to claim 105 wherein said inlet is in said lower annular cylinder portion and said outlet is in said upper annular cylinder portion of said annular cylinder.

107. The desorber according to claim 84 wherein at least a portion of said capillary twisted fluted tube forming said intermediate winding of desorber coils is enclosed in a second, generally concentric outer tube, said second generally concentric outer tube having an inlet, an outlet, an upper end portion and a lower end portion.

108. The desorber according to claim 107 wherein said outwardly extending exterior helical crest on said outside wall of said thin-wall capillary twisted fluted tube is in contact with an interior surface of said second outer tube.

109. The desorber according to claim 108 wherein said inlet is in said lower end portion of second outer tube and said outlet is in said upper end portion of said second outer tube.

110. The desorber according to claim 109 wherein said heating means is a heat transfer fluid passing into said second outer tube through said inlet, around said capillary twisted fluted tube forming said intermediate winding of desorber coils, and out of said second outer tube through said outlet.

111. The desorber according to claim 110 wherein said heat transfer fluid is said weak solution.

112. The desorber according to claim 84 wherein said heating means is a heat transfer fluid used at least in part for heating said lower winding of desorber coils.

113. The desorber according to claim 112 wherein said heat transfer fluid is combustion products.

114. The desorber according to claim 84 wherein at least a portion of said capillary twisted fluted tube forming said lower winding of desorber coils is enclosed in a second, generally concentric outer tube, said second generally concentric outer tube having an inlet, an outlet, an upper end portion and a lower end portion.

115. The desorber according to claim 114 wherein said outwardly extending exterior helical crest on said outside wall of said thin-wall capillary twisted fluted tube is in contact with an interior surface of said second outer tube.

116. The desorber according to claim 115 wherein said inlet is in said lower end portion of second outer tube and said outlet is in said upper end portion of said second outer tube.

117. The desorber according to claim 84 wherein at least a portion of said lower winding of desorber coils is enclosed in an annular cylinder comprising an inner cylindrical wall, an outer cylindrical wall, an inlet, and an outlet, said annular cylinder having an upper annular cylinder portion and a lower annular cylinder portion.

118. The desorber according to claim 117 wherein coils of said lower winding of desorber coils are in contact with each other and with said inner cylindrical wall and said outer cylindrical wall of said annular cylinder.

119. The desorber according to claim 118 wherein said inlet is in said lower annular cylinder portion and said outlet is in said upper annular cylinder portion of said annular cylinder.

120. The desorber according to claim 119 wherein said heating means is a heat transfer fluid passing through said inlet, over and around said lower winding of desorber coils and through said outlet.

121. The desorber according to claim 120 wherein said heat transfer fluid is combustion products.

122. The desorber according to claim 97 wherein:

a) at least a portion of said capillary fluted tube forming said intermediate winding of said desorber coils is enclosed in a second generally concentric outer tube, said second outer tube having an inlet, an outlet, an upper end portion and a lower end portion; said outwardly extending helical crest on said outside wall of said thin-wall capillary fluted tube in contact with an interior surface of said second outer tube throughout its helical rotation about said longitudinal tube axis; wherein said second outer tube inlet is in said lower end portion of said second outer tube and said second outer tube inlet is in said upper end portion of said second outer tube; and b) wherein at least a portion of said lower winding of said desorber coils is enclosed in a second annular cylinder comprising an inner cylindrical wall, an outer cylindrical wall, an inlet, an outlet, and having an upper annular cylinder portion and a lower annular cylinder portion; said inlet located in said lower annular cylinder portion and said outlet located in said upper annular cylinder portion; and wherein coils of said lower winding of desorber coils are in contact with each other and with said inner cylindrical wall and said outer cylindrical wall of said annular cylinder.

123. The desorber according to claim 122 wherein
   a) combustion products flow into said inlet, over and around coils of said lower winding of desorber coils, and out said outlet of said second annular cylinder enclosing at least a portion of said lower winding of desorber coils;
   b) said weak solution from said lower desorber outlet of said capillary twisted fluted tube flows into said inlet, around coils of said intermediate winding of desorber coils, and out of said outlet of said second outer tube enclosing at least a portion of said intermediate winding of desorber coils; and
   c) a heat transfer fluid flows into said inlet, over and around coils of said upper winding of desorber coils, and out of said outlet of said annular cylinder enclosing at least a portion of said upper winding of desorber coils.

124. The desorber according to claim 123 wherein said heat transfer fluid is a hydronic fluid.

125. The desorber according to claim 124 wherein said hydronic fluid is an aqueous potassium carbonate solution.

126. The desorber according to claim 123 wherein said heat transfer fluid is said strong solution.

127. An absorber and desorber combination comprising a desorber according to claim 84 and an absorber comprising:
   a) a thin-wall twisted fluted tube with a longitudinal centerline axis;
   b) said thin-wall twisted fluted tube of said absorber comprising:
      1) an upper weak solution inlet for receiving said weak solution;
      2) a gas inlet for receiving said desorbed gas to be absorbed;
      3) a lower strong solution absorber outlet serving as an outlet for said strong solution; and
   c) a cooling means for cooling at least a portion of said thin-wall twisted fluted tube.

128. The absorber and desorber combination according to claim 127 wherein said thin-wall twisted fluted tube is a second capillary twisted fluted tube.

129. The absorber and desorber combination according to claim 127 wherein said cooling means for cooling at least a portion of said thin-wall fluted tube of said absorber is direct heat exchange to said desorber.

130. The absorber and desorber combination according to claim 129 wherein said thin-wall twisted fluted tube is a second capillary twisted fluted tube.

131. The absorber and desorber combination according to claim 127 wherein at least a portion of said thin-wall twisted fluted tube is formed as a helical winding of absorber coils.

132. The absorber and desorber combination according to claim 131 wherein at least a portion of said helical winding of absorber coils is enclosed in a cylinder.

133. The absorber and desorber combination according to claim 131 wherein at least a portion of said helical winding of absorber coils is enclosed in an annular cylinder.

134. The absorber and desorber combination according to claim 131 wherein at least a portion of said helical winding of absorber coils is enclosed in an annular cylinder comprising an inner cylindrical wall, an outer cylindrical wall, an inlet, an outlet, and having an upper annular cylinder portion and a lower annular cylinder portion.

135. The absorber and desorber combination according to claim 134 wherein said inlet is located in said lower annular cylinder portion and said outlet is located in said upper annular cylinder portion; and wherein said coils of said upper helical winding of absorber coils are in contact with each other and with said inner cylindrical wall and said outer cylindrical wall of said annular cylinder; and said cooling means for cooling said absorber coil winding is a heat transfer fluid passing through said inlet, over and around said enclosed absorber coils, and through said outlet of said annular cylinder enclosing said helical winding of absorber coils.

136. The absorber and desorber combination according to claim 131 wherein at least a portion of said fluted tube forming said helical winding of absorber coils is enclosed in a second outer tube.

137. The absorber and desorber combination according to claim 131 wherein at least a portion of said helical winding of absorber coils is enclosed in a second, generally concentric outer tube, said second outer tube having an inlet, an outlet, an upper end portion and a lower end portion.

138. The absorber and desorber combination according to claim 137 wherein said outwardly extending helical crest on said outside wall of said thin-wall tube is in contact with an interior surface of said second outer tube throughout the rotation of said helical crest about said longitudinal centerline axis of said twisted fluted tube; said inlet is in said lower end portion of said second outer tube and said outlet is in said upper end portion of said second Outer tube; and said cooling means is a heat transfer fluid passing through said inlet, around said absorber thin-wall fluted tube in a confined helical path, and through said outlet of said second tube enclosing at least a portion of said helical winding of absorber coils.

139. The absorber and desorber combination according to claim 127 with said helical winding of absorber further comprising:
   1) an upper helical winding of absorber coils formed from said twisted fluted tube about an upper absorber coil centerline axis;
   2) an intermediate helical winding of absorber coils formed from said twisted fluted tube about an intermediate absorber coil centerline axis; and
   3) a lower helical winding of absorber coils formed from said twisted fluted tube about a lower absorber coil centerline axis.

140. The absorber and desorber combination according to claim 139 wherein said cooling means is a heat transfer fluid used for cooling at least one of said absorber coil windings.

141. The absorber and desorber combination according to claim 140 wherein said heat transfer fluid for cooling at least one of said absorber windings is a hydronic fluid.

142. The absorber and desorber combination according to claim 140 wherein said heat transfer fluid for cooling at least one of said absorber windings is said strong solution.

143. The absorber and desorber combination according to claim 139 wherein at least a portion of said upper helical winding of absorber coils is enclosed in an annular cylinder comprising an inner cylindrical wall, an outer cylindrical wall, an inlet, an outlet, and having an upper annular cylinder portion and a lower annular cylinder portion.

144. The absorber and desorber combination according to claim 143 wherein said inlet is located in said lower annular cylinder portion and said outlet is located in said upper annular cylinder portion; said coils of said upper helical winding of absorber coils are in contact with each other and with said inner cylindrical wall and said outer cylindrical wall of said annular cylinder; and said cooling means for cooling said upper absorber coil winding is a heat transfer fluid passing through said inlet, over and around said enclosed absorber coils, and through said outlet of said annular cylinder enclosing said upper helical winding to absorber coils.

145. The absorber and desorber combination according to claim 144 wherein said heat transfer fluid for cooling said upper absorber coil winding is also said heating means for heating said upper helical winding of desorber coils.

146. The absorber and desorber combination according to claim 144 wherein said heat transfer fluid for cooling said upper helical winding of desorber coils is a hydronic fluid.

147. The absorber and desorber combination according to claim 146 wherein said hydronic fluid for cooling said upper absorber coil winding is also said heating means for heating said upper helical winding of desorber coils.

148. The absorber/desorber combination according to claim 146 wherein said hydronic fluid for cooling said upper helical winding of absorber coils is an aqueous solution of potassium carbonate.

149. The absorber and desorber combination according to claim 148 wherein said aqueous solution of potassium carbonate is also said heating means for heating said upper helical winding of desorber coils.

150. The absorber and desorber combination according to claim 144 wherein said heat transfer fluid for cooling said upper helical winding of absorber coils is said strong solution.

151. The absorber and desorber combination according to claim 144 wherein said heat transfer fluid for cooling said upper helical winding of absorber coils is said weak solution.

152. The absorber and desorber combination according to claim 150 wherein said strong solution is also said heating means for heating said upper winding of desorber coils.

153. The absorber and desorber combination according to claim 139 wherein at least a portion of at least one of said intermediate helical winding of said absorber coils and said lower helical winding of said absorber coils is enclosed in a second, generally concentric outer tube, said second outer tube having an inlet, an outlet, an upper end portion and a lower end portion.

154. The absorber and desorber combination according to claim 153 wherein said outwardly extending helical crest on said outside wall of said thin-wall tube is in contact with an interior surface of said second outer tube; said inlet is in said lower end portion of said second outer tube and said outlet is in said upper end portion of said second outer tube; said cooling means is a heat transfer fluid passing through said inlet, around said absorber thin-wall fluted tube, and through said outlet of said second out tube enclosing at least one of said intermediate and said lower helical windings of absorber coils.

155. The absorber and desorber combination according to claim 154 wherein at least a portion of said intermediate winding of said absorber coils is enclosed in said second outer tube and said heat transfer fluid cooling said intermediate winding of absorber coils is said strong solution.

156. The absorber and desorber combination according to claim 154 wherein at least a portion of said lower winding of said absorber coils is enclosed in said second outer tube and said heat transfer fluid cooling said lower winding of absorber coils is hydronic fluid.

157. An absorber and desorber combination comprising:
a) a desorber according to claim 122;
b) an absorber comprising a thin, wall fluted tube comprising:
 1) an upper inlet for receiving said weak solution
 2) an inlet for receiving said gas to be absorbed;
 3) a lower outlet for discharging said strong solution;
 4) an upper helical winding of absorber coils formed from said thin-wall fluted tube; wherein at least a portion of said upper winding of absorber coils is enclosed in an annular cylinder comprising an inner cylindrical wall, an outer cylindrical wall, an inlet, an outlet, and having an upper annular cylinder portion and a lower annular cylinder portion; said inlet located in said lower annular cylinder portion and said outlet located in said upper annular cylinder portion; and coils of said upper winding of absorber coils are in contact with each other and with said inner cylindrical wall and said outer cylindrical wall of said annular cylinder;
 5) an intermediate helical winding of absorber coils formed from said thin-wall tube as a helical winding coils wherein at least a portion one of said intermediate winding of absorber coils is enclosed in a generally concentric second outer tube, said second outer tube having an inlet, an outlet, an upper end portion and a lower end portion; said outwardly extending helical crest on said outside wall of said thin-wall tube in contact with an interior surface of said second outer tube; and wherein said inlet is in said lower end portion of said second outer tube and said outlet is in said upper end portion of said second outer tube; and
 6) a lower helical winding of absorber coils formed from said thin-wall tube as a helical winding to coils wherein at least a portion of said lower helical winding of said absorber coils is enclosed in a second outer tube, said second, generally concentric outer tube having an inlet, an outlet, an upper end portion and a lower end portion; said outwardly extending helical crest on said outside wall of said thin-wall tube in contact with an interior surface of said second outer tube; and wherein said inlet is in said lower end portion of said second outer tube and said inlet is in said upper end portion of said second outer tube.

158. An absorber and desorber combination according to claim 157 wherein:
a) combustion products flow into said inlet, over and around coils of said lower winding of desorber coils, and out said outlet of said annular cylinder enclosing at least a portion of said lower winding of desorber coils;
b) said weak solution from said lower desorber outlet of said capillary twisted fluted tube winding flows into said inlet, around coils of said intermediate winding of desorber coils, and out said outlet of said second outer tube enclosing at least a portion of said intermediate winding of desorber coils;
c) a heat transfer fluid flows into said inlet, over and around coils of said upper winding of said desorber coils, and out said outlet of said annular cylinder enclosing at least a portion of said upper winding of desorber coils;
a) a hydronic fluid flows into said inlet, around coils of said lower winding of said absorber coils, and out said outlet of said second outer tube enclosing at least a portion of said lower winding of absorber coils;

e) said strong solution from said lower strong solution absorber outlet of said thin-wall fluted tube of said absorber flows into said inlet, around coils of said intermediate winding of said absorber coils, and out said outlet of said second outer tube enclosing at least a portion of said intermediate winding of absorber coils; and f) said heat transfer fluid flows into said inlet, over and around coils of said upper winding of said absorber coils, and out said outlet of said annular cylinder enclosing at least a portion of said upper winding of said absorber coils.

159. The absorber and desorber combination according to claim 158 wherein said heat transfer fluid is a hydronic fluid.

160. The absorber and desorber combination according to claim 159 wherein said hydronic fluid from said outlet of said annular cylinder enclosing at least a portion of said upper winding of said absorber coils is returned to said inlet of said annular cylinder enclosing at least a portion of said upper winding of desorber coils and then is returned from said outlet of said annular cylinder enclosing said upper winding of desorber coils to said inlet of said annular cylinder enclosing said upper winding of said absorber coils.

161. The absorber and desorber combination according to claim 159 wherein said hydronic fluid is an aqueous solution of potassium carbonate.

162. The absorber and desorber combination according to claim 158 wherein said heat transfer fluid is said strong solution.

163. The absorber and desorber combination according to claim 158 wherein said heat transfer fluid is said weak solution.

164. The absorber and desorber combination according to claim 162 wherein said strong solution from said outlet of said annular cylinder enclosing said upper winding of desorber coils passes to said upper strong solution inlet of said desorber capillary twisted fluted tube.

165. The absorber and desorber combination according to claim 162 wherein said strong solution from said outlet of said annular cylinder enclosing said upper winding of absorber coils passes to said inlet of said annular cylinder enclosing said upper winding of desorber coils.

166. The absorber and desorber combination according to claim 162 wherein a portion of said strong solution passes from said lower strong solution outlet of said absorber twisted fluted tube to said inlet of said annular cylinder enclosing said upper winding of absorber coils.

167. The absorber and desorber combination according to claim 162 wherein a portion of said strong solution passes from said outlet of said second outer tube enclosing said intermediate winding of absorber coils passes to said inlet of said annular cylinder enclosing said upper winding of absorber coils.

168. The absorber and desorber combination according to claim 157 further comprising:

a) a first fluid connector joining said lower strong solution outlet of said absorber twisted fluted tube to said inlet of said second outer tube enclosing said intermediate winding of absorber coils;

b) a second fluid connector joining said outlet of said second outer tube enclosing said intermediate winding of absorber coils to said upper strong solution inlet of said desorber capillary twisted fluted tube;

c) a third fluid connector joining said lower weak solution outlet of said desorber capillary twisted fluted tube to said inlet of said second outer tube enclosing said intermediate winding of desorber coils;

d) a forth fluid connector joining said outlet of said second outer tube enclosing said intermediate winding of desorber coils to said upper weak solution inlet of said absorber twisted fluted tube; and e) a fifth fluid connector joining said outlet of said annular cylinder enclosing said upper winding of absorber coils to said inlet of said annular cylinder enclosing said upper winding of desorber coils.

169. The absorber and desorber combination according to claim 168 further comprising a sixth fluid connector connecting said outlet of said annular cylinder enclosing said upper winding of said desorber coils with said inlet of said annular cylinder enclosing said upper winding of absorber coils.

170. The absorber and desorber combination according to claim 168 further comprising a fluid connector connecting said first fluid connector with said inlet of said annular cylinder enclosing said upper winding of absorber coils.

171. The absorber and desorber combination according to claim 167 further comprising a fluid connector connecting said second fluid connector with said inlet of said annular cylinder enclosing said upper winding of absorber coils.

172. A heat transfer system with an interconnected absorber, desorber, condenser, and evaporator comprising said capillary twisted fluted tube according to claim 1.

173. A heat transfer system with an interconnected absorber, desorber, condenser, and evaporator comprising said tubularly enclosed capillary twisted fluted tube helical winding according to claim 10.

174. A heat transfer system with an interconnected absorber, desorber, condenser, and evaporator comprising said tubularly enclosed capillary twisted fluted tube helical winding according to claim 12.

175. A heat transfer system with an interconnected absorber, desorber, condenser, and evaporator comprising said capillary twisted fluted tube helical winding according to claim 13.

176. A heat transfer system with an interconnected absorber, desorber, condenser, and evaporator comprising said cylindrically enclosed capillary twisted fluted tube according to claim 14.

177. A heat transfer system with an interconnected absorber, desorber, condenser, and evaporator comprising said annularly enclosed capillary twisted fluted tube winding of claim 18.

178. A heat transfer system with an interconnected absorber, desorber, condenser, and evaporator with said desorber formed according to claim 21.

179. A heat transfer system with an interconnected absorber, desorber, condenser, and evaporator with said desorber formed according to claim 34.

180. A heat transfer system with an interconnected absorber, desorber, condenser, and evaporator with said desorber formed according to claim 122.

181. A heat transfer System with an interconnected absorber, desorber, condenser, and evaporator with said desorber formed according to claim 168.

182. A method for using the capillary twisted fluted tube of claim 1 as a mass transfer device comprising:

1) positioning said capillary twisted fluted tube with a longitudinal axis of said tube in a slanting, generally horizontal orientation, said capillary twisted fluted tube having an upper end and a lower end;

2) flowing a liquid in said capillary twisted fluted tube in a direction from said upper end of said capillary twisted fluted tube to said lower end of said capillary twisted fluted tube, said liquid occupying less than the total portion of said interior capillary twisted fluted tube wall,space;

3) raising said liquid from a bottom part of said tube in said helical capillary tube channel with capillary action;

4) expelling said liquid from said helical capillary tube channel, through said capillary channel slit, and into said interior tube-wall space; and 5) removing vapor from said capillary twisted fluted tube.

183. The method for using a capillary twisted fluted tube according to claim 182 further comprising the step of wetting said interior surface of said thin-wall tube with said liquid.

184. The method according to claim 182 wherein said liquid is a strong solution.

185. The method according to claim 184 further comprising the step of removing a weak solution from said capillary twisted fluted tube.

186. The method according to claim 182 wherein said liquid is a condensed gas.

187. The method according to claim 182 further comprising the step of heating at least a portion of said exterior surface of said capillary twisted fluted tube during said step of flowing said liquid.

188. The method according to claim 187 wherein said heating step is carried out by heating at least a portion of said exterior surface of said capillary twisted fluted tube with a heat transfer fluid.

189. The method according to claim 188 wherein said heating step is carried out by placing said heat transfer fluid in confined flow with said exterior surface of said capillary twisted fluted tube.

190. The method according to claim 188 wherein said heating step is carried out by placing said heat transfer fluid in confined helical flow with said exterior surface of said capillary twisted fluted tube.

191. The method according to claim 188 wherein said heating step is carried out by placing said heat transfer fluid in confined cross flow with said exterior surface of said capillary twisted fluted tube.

192. The method according to claim 188 wherein said heating step is carried out by placing said heat transfer fluid in confined counter-current flow with said exterior surface of said capillary twisted fluted tube with respect to said flowing of said liquid within said capillary twisted fluted tube.

193. The method according to claim 188 wherein said heating step is carried out by heating a side of said capillary twisted fluted tube opposite a side of said capillary twisted fluted tube in which said step of raising said liquid in said interior helical capillary tube flute is carried out.

194. The method according to claim 187 wherein said heating step is carried out by heating at least a portion of said capillary twisted fluted tube with an exothermic process in direct heat exchange relation with said capillary twisted fluted tube.

195. The method according to claim 194 wherein said exothermic process for carrying out said step of heating at least a portion of said capillary twisted fluted tube is an absorption process.

196. The method according to claim 194 wherein said exothermic process for carrying out said step of heating at least a portion of said capillary twisted fluted tube is a condensation process.

197. The method according to claim 194 wherein said exothermic process for carrying out said step of heating at least a portion of said capillary twisted fluted tube is a rectification process.

198. The method according to claim 188 wherein said heating step is carried out by heating at least a portion of said capillary twisted fluted tube with combustion products.

199. The method according to claim 188 wherein said heating step is carried out by heating at least a portion of said capillary twisted fluted tube with hydronic fluid.

200. The method according to claim 188 wherein said heating step is carried out by heating at least a portion of said capillary twisted fluted tube with weak solution.

201. The method according to claim 188 wherein said heating step is carried out by heating at least a portion of said capillary twisted fluted tube with strong solution.

202. The method according to claim 182 further comprising the steps of at least partially filling said capillary twisted fluted tube with a packing material prior to expelling said solution from said interior helical capillary flute.

203. The tubularly enclosed capillary twisted fluted tube of claim 9 wherein said second tube is a second capillary twisted fluted tube.

204. The tubularly enclosed capillary twisted fluted tube of claim 203 wherein the direction of said helical rotation of said exterior helical crest of said tubularly enclosed capillary twisted fluted tube is the same as a helical rotation of an exterior helical crest of said second capillary twisted fluted tube.

205. The tubularly enclosed capillary twisted fluted tube of claim 203 wherein the direction of said helical rotation of said exterior helical crest of said tubularly enclosed capillary twisted fluted tube is opposite to a helical rotation of an exterior helical crest of said second capillary twisted fluted tube.

206. A method of using the tubularly enclosed capillary twisted fluted tube of claim 9 wherein:

a. an endothermic process is carried out in said tubularly enclosed capillary twisted fluted tube and b. an exothermic process is carried out in a space between said tubularly enclosed capillary twisted fluted tube and said second enclosing tube.

207. The method according to claim 206 wherein said endothermic process is a process selected from the processes of desorption and evaporation and said exothermic process is a process section from the process of absorption, condensation, and rectification.

208. A method of using the tubularly enclosed capillary twisted fluted tube of claim 9 wherein:

a. an exothermic process is carried out in said tubularly enclosed capillary twisted fluted tube and b. an endothermic process is carried out in a space between said tubularly enclosed capillary twisted fluted tube and said second enclosing tube.

209. The method according to claim 208 wherein said endothermic process is a process selected from the processes of desorption and evaporation and said exothermic process is a process section from the process of absorption, condensation, and rectification.

210. A method of using the cylindrically enclosed capillary twisted fluted tube of claim 14 wherein:

a. an endothermic process is carried out in said cylindrically enclosed capillary twisted fluted tube and b. an exothermic process is carried out in a space between said cylindrically enclosed capillary twisted fluted tube and said cylinder.

211. The method according to claim 210 wherein said endothermic process is a process selected from the processes of desorption and evaporation and said exothermic process is a process section from the process of absorption, condensation, and rectification.

212. A method of using the cylindrically enclosed capillary twisted fluted tube of claim 14 wherein:

a. an exothermic process is carried out in said cylindrically enclosed capillary twisted fluted tube and b. an endothermic process is carried out in a space between said cylindrically enclosed capillary twisted fluted tube and said cylinder.

213. The method according to claim 212 wherein said endothermic process is a process selected from the processes of desorption and evaporation and said exothermic process is a process section from the process of absorption, condensation, and rectification.

214. A method of using the annularly enclosed capillary twisted fluted tube of claim 15 wherein:

a. an endothermic process is carried out in said annularly enclosed capillary twisted fluted tube and b. an exothermic process is carried out in a space between said annularly enclosed capillary twisted fluted tube and said annular cylinder.

215. The method according to claim 214 wherein said endothermic process is a process selected from the processes of desorption and evaporation and said exothermic process is a process section from the process of absorption, condensation, and rectification.

216. A method of using the annularly enclosed capillary twisted fluted tube of claim 15 wherein:

a. an exothermic process is carried out in said annularly enclosed capillary twisted fluted tube and b. an endothermic process is carried out in a space between said annularly enclosed capillary twisted fluted tube and said annular cylinder.

217. The method according to claim 216 wherein said endothermic process is a process selected from processes of desorption and evaporation and said exothermic process is a process section from the process of absorption, condensation, and rectification.

218. The desorber according to claim 123 wherein said heat transfer fluid is a weak solution.

* * * * *

UNITED STATES PATENT AND TRADEMARK OFFICE
CERTIFICATE OF CORRECTION

PATENT NO. : 5,617,737
DATED : April 8, 1997
INVENTOR(S) : Christensen et al.

It is certified that error appears in the above-indentified patent and that said Letters Patent is hereby corrected as shown below:

Column 1, line 17, delete "know" and insert therefor - - known - -.

Column 7, line 23, delete "take" and insert therefor - - taken - -.

Column 12, line 19, delete "58" and insert therefor - - 48 - -;

line 61, delete "crusts" and insert therefor - - crests - -.

Column 13, line 1, delete "70" and insert therefor - - 72 - -;

line 57, delete "94" and insert therefor - - 92 - -;

line 60, delete "102" and insert therefor - - 101 - -;

line 61, delete "102" and insert therefor - - 101 - -.

Column 14, line 2, delete "heaving" and insert therefor - - having - -;

line 9, delete "102" and insert therefor - - 101 - -.

Column 15, line 52, after "30" delete "that".

Column 17, line 7, delete "enters" and insert therfor - - enter - -;

line 8, after "116," delete "flows" and insert therefor - - flow - -;

line 8, delete "over around" and insert therefor - - over and around - -;

line 9, delete "leaves" and insert therefor - - leave - -.

Column 23, line 26, after "cylinder" delete "210" and insert therefor - - 216 - -;

line 50, delete "380" and insert therefor - - 382 - -.

UNITED STATES PATENT AND TRADEMARK OFFICE
CERTIFICATE OF CORRECTION

PATENT NO. : 5,617,737
DATED : April 8, 1997
INVENTOR(S) : Christensen et al.

It is certified that error appears in the above-indentified patent and that said Letters Patent is hereby corrected as shown below:

Column 29, line 43, delete "evaporated" and insert therefor - - evaporator - -.

Column 30, line 58, delete "stream" and insert therefor - - steam - -;

line 61, delete "stream" and insert therefor - - steam - -.

Column 44, line 32, delete "Outer" and insert therefor - - outer - -.

Column 46, line 64, delete "a)" and insert therefor - - d) - -.

Signed and Sealed this

Twenty-first Day of October 1997

Attest:

BRUCE LEHMAN

*Attesting Officer*     *Commissioner of Patents and Trademarks*